(12) United States Patent
Cullinan et al.

(10) Patent No.: US 12,448,258 B1
(45) Date of Patent: Oct. 21, 2025

(54) APPARATUS AND METHOD FOR REMOVAL OF VEHICLE HARDTOP

(71) Applicant: John D. Cullinan, Mason, OH (US)

(72) Inventors: John D. Cullinan, Mason, OH (US); Shaw Kaake, Kita-ku (JP)

(73) Assignee: John D. Cullinan, Mason, OH (US)

( * ) Notice: Subject to any disclaimer, the term of this patent is extended or adjusted under 35 U.S.C. 154(b) by 235 days.

(21) Appl. No.: 17/513,628

(22) Filed: Oct. 28, 2021

Related U.S. Application Data

(60) Provisional application No. 63/106,868, filed on Oct. 28, 2020.

(51) Int. Cl.
| | |
|---|---|
| *B66C 23/48* | (2006.01) |
| *B25H 1/00* | (2006.01) |
| *B60J 7/10* | (2006.01) |
| *B60S 9/08* | (2006.01) |
| *B66F 5/02* | (2006.01) |
| *B60D 1/66* | (2006.01) |
| *B60S 9/18* | (2006.01) |

(52) U.S. Cl.
CPC ........... *B66F 5/025* (2013.01); *B25H 1/0007* (2013.01); *B60J 7/106* (2013.01); *B66C 23/48* (2013.01); *B60D 1/66* (2013.01); *B60S 9/08* (2013.01); *B60S 9/18* (2013.01)

(58) Field of Classification Search
CPC ............ B66F 5/025; B60J 7/106; B66C 23/48
USPC .................................................. 254/102, 420
See application file for complete search history.

(56) References Cited

U.S. PATENT DOCUMENTS

| | | | |
|---|---|---|---|
| 1,445,838 A | 2/1923 | Lovejoy |
| 1,725,329 A | 8/1929 | Blandford |
| 2,502,510 A | 4/1950 | Daugert |
| 2,570,741 A | 10/1951 | Zeh |
| 2,719,060 A | 9/1955 | Taylor |
| 2,799,920 A | 7/1957 | Hansen |
| 2,803,872 A | 8/1957 | Massa |
| 2,804,979 A | 9/1957 | Lassiter |
| 2,939,590 A | 6/1960 | Henry |
| 3,028,978 A | 4/1962 | Dickens |
| 3,058,602 A | 10/1962 | Kilman |
| 3,391,905 A | 7/1968 | Burns |
| 3,958,793 A | 5/1976 | Garate |
| 4,183,511 A | 1/1980 | Marek |

(Continued)

FOREIGN PATENT DOCUMENTS

| | | | |
|---|---|---|---|
| CA | 493629 A | | 6/1953 |
| CN | 102313485 A | * | 1/2012 |

(Continued)

OTHER PUBLICATIONS

Gladiator Pro (TM) TopLiftPros (Year: 2023).*

(Continued)

*Primary Examiner* — Mahdi H Nejad
(74) *Attorney, Agent, or Firm* — Wood Herron & Evans LLP

(57) ABSTRACT

A removeable vehicle hardtop lift apparatus is described which includes a lower platform, an upper platform and a linear actuator there-between. The upper platform may have adjustable supports, The linear actuator may be configured to move the upper platform linearly. The linear actuator may include a drive mechanism with a hand crank that is operable to cause the linear actuator to raise and lower the upper platform.

20 Claims, 26 Drawing Sheets

(56) References Cited

U.S. PATENT DOCUMENTS

| | | | |
|---|---|---|---|
| 4,209,166 A | 6/1980 | DeRouen | |
| 4,560,031 A | 12/1985 | Dixon et al. | |
| 4,576,542 A | 3/1986 | Brasell et al. | |
| 4,600,348 A | 7/1986 | Pettit | |
| 4,867,465 A | 9/1989 | Dunchock | |
| 5,423,518 A * | 6/1995 | Baxter | B60S 9/08 254/419 |
| 5,435,523 A | 7/1995 | Hying et al. | |
| D375,603 S | 11/1996 | Carver | |
| 5,707,450 A | 1/1998 | Thompson | |
| 5,897,101 A | 4/1999 | Snyder | |
| 5,915,742 A | 6/1999 | Hung | |
| 6,158,701 A | 12/2000 | Deshler | |
| 6,170,802 B1 | 1/2001 | Stovall | |
| 6,173,947 B1 | 1/2001 | Johnson | |
| 6,176,063 B1 | 1/2001 | Warin | |
| 6,257,552 B1 | 7/2001 | Crow et al. | |
| 6,296,239 B1 * | 10/2001 | Sawyer | B25B 11/02 269/68 |
| 6,309,007 B1 | 10/2001 | Essig et al. | |
| 6,357,986 B1 | 3/2002 | Sonnamaker et al. | |
| 6,409,128 B1 | 6/2002 | Deshler | |
| 6,457,700 B1 | 10/2002 | Hong | |
| 6,786,494 B2 | 9/2004 | Garbiso | |
| 7,172,204 B1 | 2/2007 | Tierney | |
| 7,225,482 B2 | 6/2007 | Brooks | |
| 7,296,787 B2 | 11/2007 | Barrios et al. | |
| 7,448,606 B1 * | 11/2008 | Johnson | B05B 13/0285 269/16 |
| 7,708,250 B1 | 5/2010 | Dein | |
| 8,146,890 B2 | 4/2012 | Lin et al. | |
| 8,272,084 B2 | 9/2012 | Spidare et al. | |
| 8,641,355 B2 | 2/2014 | Pawlak | |
| 8,770,561 B2 | 7/2014 | Gagnon, Jr. | |
| 9,321,615 B2 | 4/2016 | Shaw et al. | |
| 9,463,967 B1 | 10/2016 | Meyer | |
| 9,576,470 B2 | 2/2017 | Jensen | |
| 9,643,823 B2 | 5/2017 | Hall | |
| 9,771,990 B2 | 9/2017 | Slee | |
| 9,932,209 B2 * | 4/2018 | Smith | B66C 23/48 |
| D839,793 S | 2/2019 | Lee | |
| 10,227,079 B2 | 3/2019 | Myers | |
| 10,246,307 B1 | 4/2019 | Baier | |
| D868,413 S | 11/2019 | Stannow | |
| 10,968,086 B1 * | 4/2021 | Tennant | B66F 7/26 |
| D940,651 S | 1/2022 | Muller et al. | |
| D945,109 S | 3/2022 | Bekken et al. | |
| 11,332,208 B2 | 5/2022 | Hall | |
| 11,608,037 B1 * | 3/2023 | Swanson | B66F 3/10 |
| 2006/0208240 A1 | 9/2006 | Spittle et al. | |
| 2006/0261320 A1 | 11/2006 | Crawford | |
| 2007/0104558 A1 | 5/2007 | Narelli | |
| 2008/0053946 A1 | 3/2008 | Choate et al. | |
| 2009/0184217 A1 | 7/2009 | Sprout | |
| 2009/0278296 A1 | 11/2009 | Fulcher et al. | |
| 2009/0309079 A1 | 12/2009 | Lacina | |
| 2014/0246637 A1 * | 9/2014 | Anderson | B60S 9/18 254/425 |
| 2016/0137468 A1 | 5/2016 | Walker | |
| 2016/0257328 A1 | 9/2016 | Myers | |
| 2016/0311662 A1 | 10/2016 | Smith et al. | |
| 2018/0257467 A1 | 9/2018 | Rodriguez | |
| 2018/0290701 A1 | 10/2018 | Stirling | |
| 2019/0100418 A1 | 4/2019 | Jin et al. | |
| 2020/0131008 A1 | 4/2020 | Hall | |
| 2023/0257042 A1 * | 8/2023 | Hall | B62D 65/022 414/815 |

FOREIGN PATENT DOCUMENTS

| | | | |
|---|---|---|---|
| CN | 107336781 A * | 11/2017 | |
| DE | 4407170 C2 | 9/1995 | |
| DE | 19508969 A1 * | 10/1996 | B66C 23/48 |
| EP | 0 716 041 A1 | 6/1996 | |
| EP | 0 777 021 A1 | 6/1997 | |
| EP | 1 243 545 A2 | 9/2002 | |
| EP | 1531239 A2 * | 5/2005 | F01L 1/02 |
| EP | 2 394 785 A1 | 12/2011 | |
| FR | 2828875 | 8/2004 | |
| WO | WO 2006/48527 A1 | 5/2006 | |
| WO | WO 2012/131119 A1 | 10/2012 | |

OTHER PUBLICATIONS

Assembly Instructions TopLiftPros (Year: 2017).*
Ford Bronco HardTop lift TopLiftPros (Year: 2023).*
Venture Pro Assembly Manual TopLiftPros (Year: 2023).*
"Assembly Instructions" (TopLift Pros) Feb. 27, 2018 (Feb. 27, 2018), [online] (retrieved from the internet on Jan. 30, 2020) <URL: https://uploads-ssl.webflow.com/59249fc365efbd2b0eb398bc/5a95acfc892ae80001937511_Instruction_Manual_v4.0.compressed.pdf>, 19 pgs.
"Source Code" (TopLift Pros) Feb. 12, 2020 (Feb. 12, 2020), [online] (retrieved from the internet on Feb. 12, 2020) <URL: https://uploads-ssl.webflow.com/59249fc365efbd2b0eb398bc/5a95acfc892ae80001937511_Instruction_Manual_v4.0.compressed.pdf > entire document. (cited to establish the publication date of "Assembly Instructions" (TopLift Pros)), 19 pgs.
"Door Lift Manual" (TopLift Pros) Oct. 26, 2018 (Oct. 26, 2018), [online] (retrieved from the internet on Jan. 30, 2020) <URL: https://assets website-files.com/59249fc365efbd2b0eb398bc/5bd38689a4e4ab0ef79aba6d_DOOR%20LIFT%20MANUAL.PDF> entire document, 3 pgs.
"Source Code" (TopLift Pros) Feb. 12, 2020 (Feb. 12, 2020), [online] (retrieved from the internet on Feb. 12, 2020) <URL: https://assets website-files.com/59249fc365efbd2b0eb398bc/5bd38689a4e4ab0ef79aba6d_DOOR%20LIFT%20MANUAL.PDF> entire document. (cited to establish the publication date of "Door Lift Manual" (TopLift Pros)), 3 pgs.
'Performance TV—EP 1708' (Masters Entertainment Group) Mar. 21, 2017 (Mar. 21, 2017), [online] (retrieved from the internet on Jan. 30, 2020) <URL: https://www.youtube.com/watch?v=YrHdMCw5ZI4> entire document, especially 6:30-11:30, 1 pg.
'TopLift Pro Assembly Video 1' (Top Lift Pros) Mar. 3, 2017 (Mar. 3, 2017), [online] (retrieved from the Internet on Feb. 12, 2020) <URL: https://www.youtube.com/watch?v=sKTKE1OeweM&feature=youtu.be> entire document, especially 1:45-2:00, 11:50-13:05, 1 pg.
'Video 1-Base Assembly TopLift Pros' (Top Lift Pros), Jun. 23, 2017, [online], [retrieved from the internet on Jun. 19, 2020], <URL: https://youtu.be/RWV6zCUBkdU > (Year: 2017), 1 pg.
'Video 2-Upper Assembly TopLift Pros' (Top Lift Pros), Jun. 23, 2017, [online], [retrieved from the internet on Jun. 19, 2020], <URL: https://youtu.be/CjzvztpJWz4 > (Year: 2017), 1 pg.
Tycho, JK Enthusiast, drawing of sample engine lift, Christchurch, New Zealand, Nov. 2009, 10 pgs.
International Search Report and Written Opinion dated Feb. 27, 2020 for Application No. PCT/US2019/054781, 13 pgs.
International Preliminary Report on Patentability dated Apr. 27, 2021 for Application No. PCT/US2019/054781, 8 pgs.
Dale Crabtree, "New all in one Jeep Wrangler Top and Door removal/ Lift / Hoist and storage device", Internet, https://www.youtube.com/watch?v=08cn2krRvM4, Jan. 31, 2018 (Jan. 31, 2018): accessed May 17, 2023.
Mercedes-Benz, Accessories Assembly Instructions, 1995.

* cited by examiner

APPARATUS AND METHOD FOR REMOVAL OF VEHICLE HARDTOP

TECHNICAL FIELD

The present disclosure relates generally to apparatuses and methods for removing a hardtop from a vehicle. Disclosed is a lift for lifting a removable hardtop off of a vehicle which may be used to store the hardtop and used to facilitate reinstallation of the hardtop.

BACKGROUND

Many vehicles have removable tops which often are hardtops. (As used herein, "hardtop", unless otherwise indicated, refers to any removable vehicle top.) The combination of the physical attributes, including without limitation size, shape and weight, and the location of the top on the vehicle presents difficulty for the removal, storage and reinstallation of the hardtop. Although lift apparatuses are known in the art, none of the prior art lifts provides the structure, function or advantages as described and claimed below.

Additionally, the need or desire to remove, store and reinstall a hardtop is not limited to a single location, such as the garage in which the vehicle is typically kept. There is a need for a portable lift which may be transported, stowed for example with relative ease within the vehicle itself, to one or more other ad hoc locations and quickly and easily assembled and disassembled, thereby allowing vehicle owners to travel to any location with the hardtop on the vehicle, remove the hardtop at the location and reinstall the hardtop at that location and easily re-stow the lift within the vehicle.

BRIEF DESCRIPTION OF THE DRAWINGS

The accompanying drawings together with specification, including the detailed description which follows, serve to explain the principles of the present innovation.

DETAILED DESCRIPTION

Figure 1A:
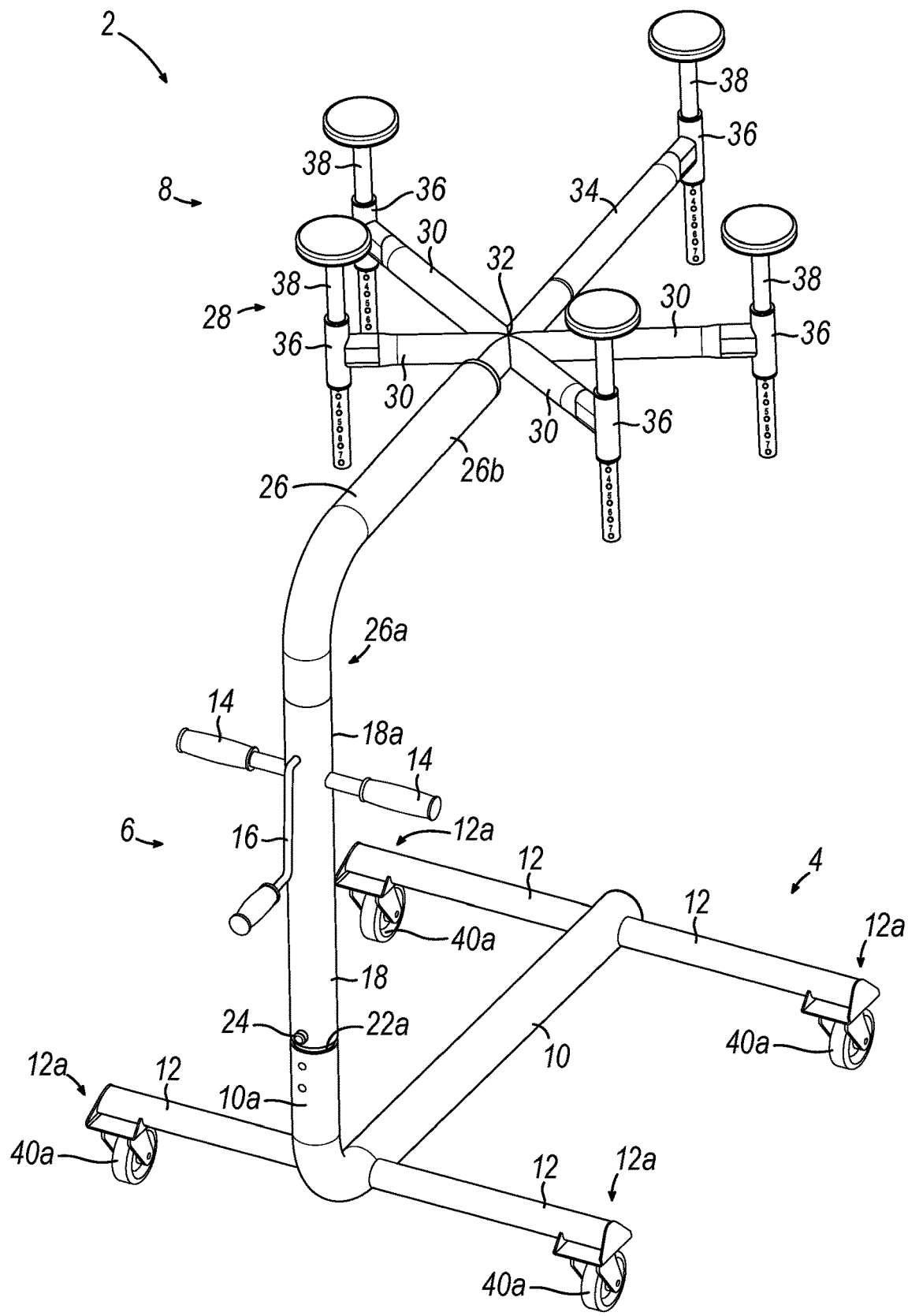
FIG. 1A is a perspective view of a lift configured in accordance with one or more teachings of the present innovation.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment constructed according to the teachings of the present innovation is described.

To the extent necessary, the disclosure as explicitly set forth herein supersedes any conflicting material incorporated herein by reference.

FIG. 1A illustrates a lift, generally indicated at 2, which is configured in accordance with one or more teachings of the present innovation. Lift 2, in the embodiment depicted, comprises lower platform assembly 4, linear actuator 6 and upper platform assembly 8. Lower platform assembly 4 is illustrated as comprising main support 10 and a plurality of legs 12. As will be described below, lower platform assembly 4 is configured for quick and easy assembly and disassembly, and for compact storage. Lower platform assembly 4 is configured to fit under a vehicle.

Linear actuator 6, which creates motion in a straight line, may be of any suitable configuration, such as, without limitation, a mechanical actuator, hydraulic actuator and pneumatic actuator. Linear actuator 6 as depicted in the embodiment is illustrated as a screw jack form of mechanical actuator. Linear actuator 6 may also be referred to herein as jack assembly 6.

Figure 1B:
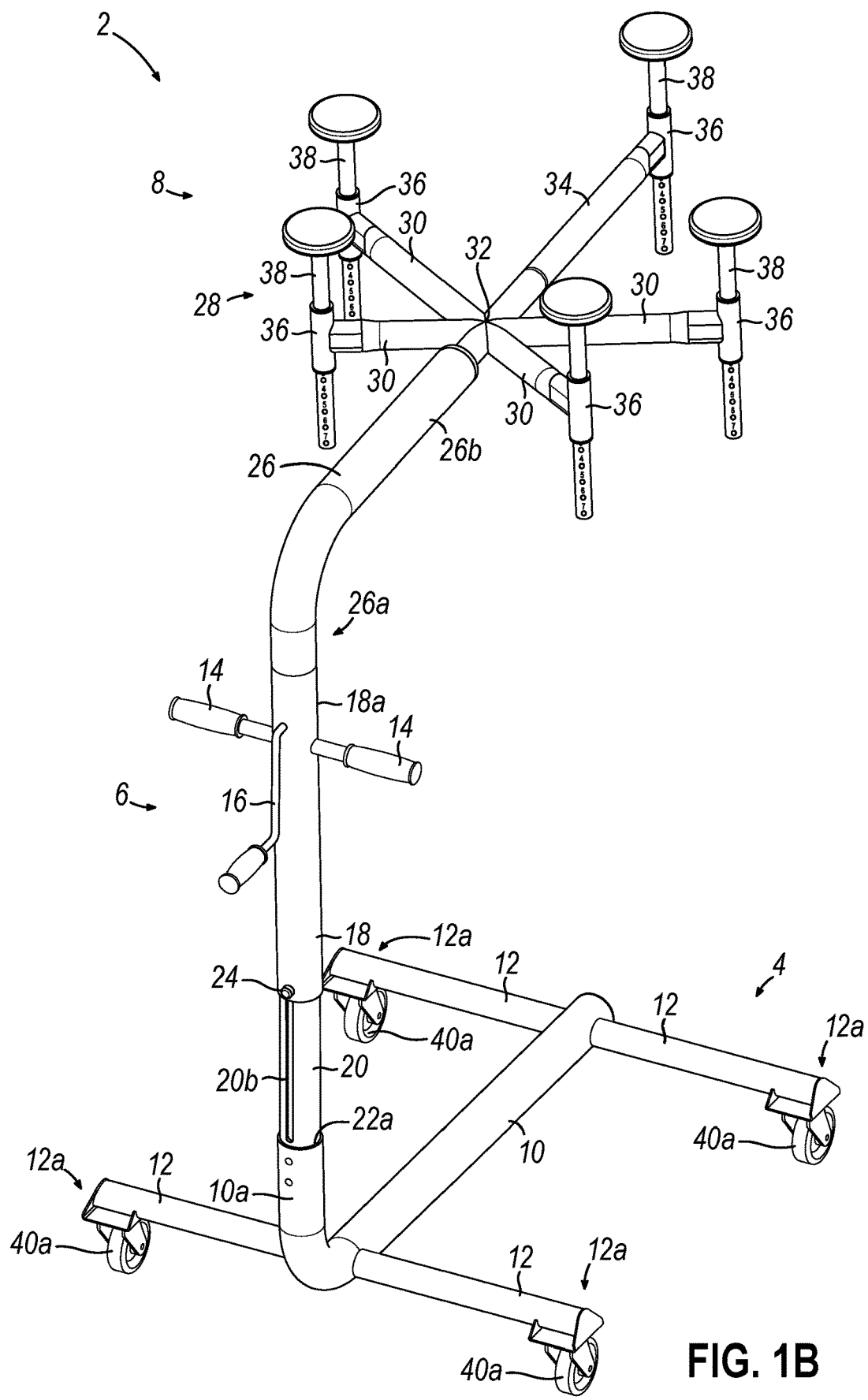
FIG. 1B is a perspective of the lift of FIG. 1A with the linear actuator in an extended position.

Referring also to FIG. 1B, which shows the lift of FIG. 1A with linear actuator 6 in an extended position, this embodiment of linear actuator 6 is illustrated as comprising a plurality of handles 14, hand crank 16, outer actuator tube 18 and inner actuator tube 20. Lower portion 20a (not directly visible in FIGS. 1A and 1B) of inner actuator tube 20 is carried and supported by upper end 10a of main support 10, disposed in bushing 22a which is disposed in upper end 10a. This embodiment of linear actuator 6 includes anti-rotation pin 24 which extends into slot 20b and prevents outer actuator tube 18 from rotating as linear actuator 6 is extended from and between a fully contracted position at which linear actuator 6 is fully contracted to a fully extended position at which linear actuator 6 is fully extended.

Upper platform assembly 8 is illustrated in the embodiment depicted as comprising upper elbow 26 and hub assembly 28. Upper elbow 26 comprises generally straight portion 26b and lower end 26a (not directly visible in FIGS. 1A and 1B) of upper elbow 26 which is carried and supported by upper end 18a of outer actuator tube 18. In the depicted embodiment, hub assembly 28 comprises a plurality of arms 30 extending outwardly from centrally disposed hub 32. Although the plurality of arms 30 is illustrated as extending from each arm's respective proximal end from the same general area, it is within the teachings of the present innovation for any or all of the plurality of arms 30 to be configured to extend non-adjacently from hub assembly 32, such as from spaced apart discrete locations, or from non-adjacent areas of upper platform assembly 8 in general. It is also within the teachings of the present innovation for arms 30 to be detachable.

In the depicted embodiment, upper platform assembly includes removable arm 34. As described below, the removability of removable arm 34 allows it to be installed after a hardtop has been lifted from the vehicle to a position at which it is clear of any vehicle supports. It is within the teachings of the present innovation that all arms 30 could be removable, with attachment to upper platform assembly 8/hub 32 being part of the process for assembling lift 2. In an alternative embodiment, hub 32 could be/remain attached to upper elbow assembly 26 prior to the process of assembling lift 2. It will be appreciated that the fewer components which need to be attached during assembly, the less time require for assembly of lift 2.

At the respective distal end 30a, 34a of each arm, there may be respective support carrier 36 which receives and locates a respective support 38. Supports 38 may be vertically adjustable relative to support carrier 36 to allow conformation of the tops of supports 38 to the engaged surface of the hardtop to maintain the hard top in the desired orientation, such as level or relatively level, when it is supported by lift 2. In an alternative embodiment, the height of lift 2 (distance between upper platform assembly 8/tops of supports 38 and the lower tangent of wheels 40a) could be adjustably set independent of linear actuator 6 by providing one or more extendable sections disposed between lower platform assembly 4 and upper platform assembly 8. This would allow the height of lift 2 to be set at a predetermined minimum height locating the tops of supports 38 low enough to clear the hardtop, thereby reducing the amount of travel required by linear actuator 6 to lift the hardtop off of a vehicle. For example, an adjustable length member (such as inner and outer concentrically disposed tubes whose relative position may be set by selectively aligning one or more respective openings in the inner tube with one or more respective openings in the outer tube and disposing a pin therein) could be disposed between linear actuator 6 and either of upper platform assembly 8 or lower platform assembly 4.

The number and configuration of arms 30, 34 are such as are suitable for the removal, support and reinstallation of the hardtop. Lower platform assembly 4 is disposed relative to upper platform assembly 8 such that the center of gravity lift 2 with a hardtop carried by upper platform assembly 8 falls within the footprint of the points of contact between lower platform assembly 4 and the surface which supports lift 2. In the depicted embodiment, the footprint is defined by the points of contact of wheels 40a with the floor.

The angle between the centerline of linear actuator 6 (such as the centerline of outer actuator tube 18 or the centerline of inner actuator tube 20, which are coincident) and main support 10 is designated $\alpha$. $\alpha$ may be any suitable angle. In the depicted embodiment, a is nominally 92°. The angle between the centerline of straight portion 26b and the centerline of linear actuator 6 is designated $\beta$. $\beta$ may be any suitable angle. In the depicted embodiment, $\beta$ is nominally 92. Thus, the centerline of straight portion 26b is nominally disposed at 4° above horizontal (the plane of the points of contact of wheels 40a) when lift 2 is not loaded. In the embodiment depicted, the resultant bending moment when lift 2 is loaded as intended, i.e., supporting a hardtop, acting on members of lift 2 causes the centerline of straight portion 26b to be nominally horizontal (i.e., parallel to the plane of the points of contact of wheels 40a). Thus, in one embodiment, the size of the members of lift 2, the type of material and the relative angles between the aforementioned centerlines are configured so as to orient a hardtop supported by lift generally horizontally.

Figure 2:
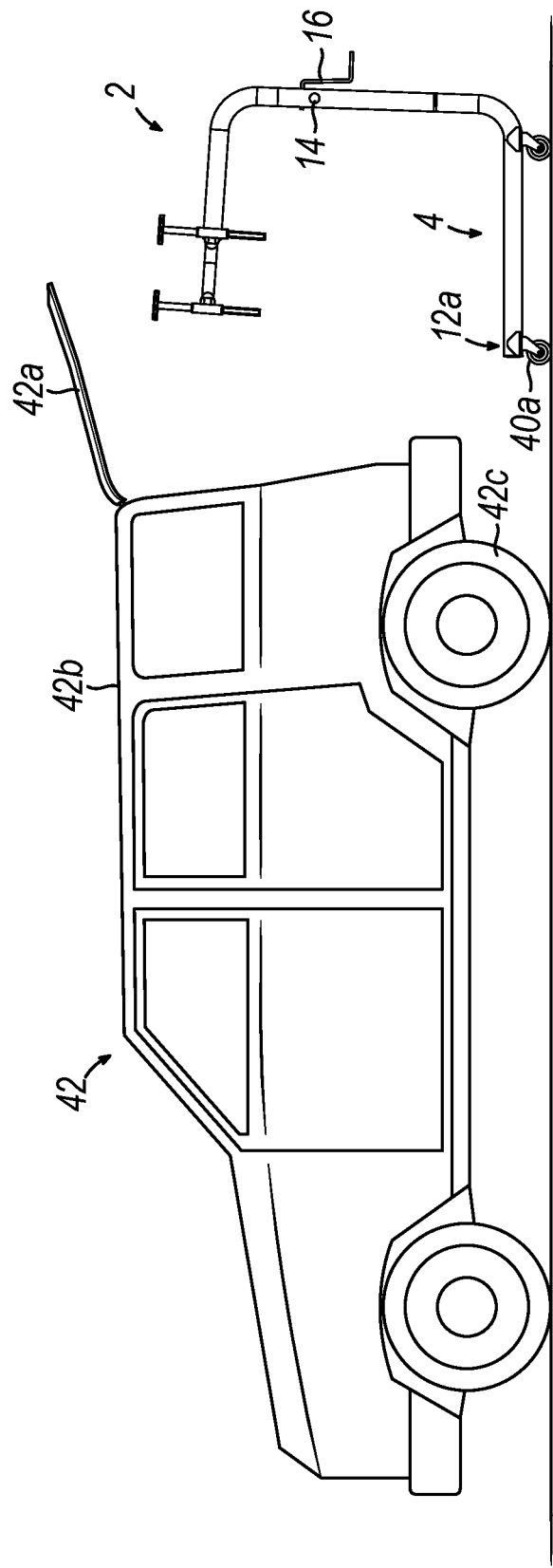
FIG. 2 illustrates the lift of FIG. 1A located adjacent a vehicle, ready to be moved into a position extending under the hardtop.
Figure 3:
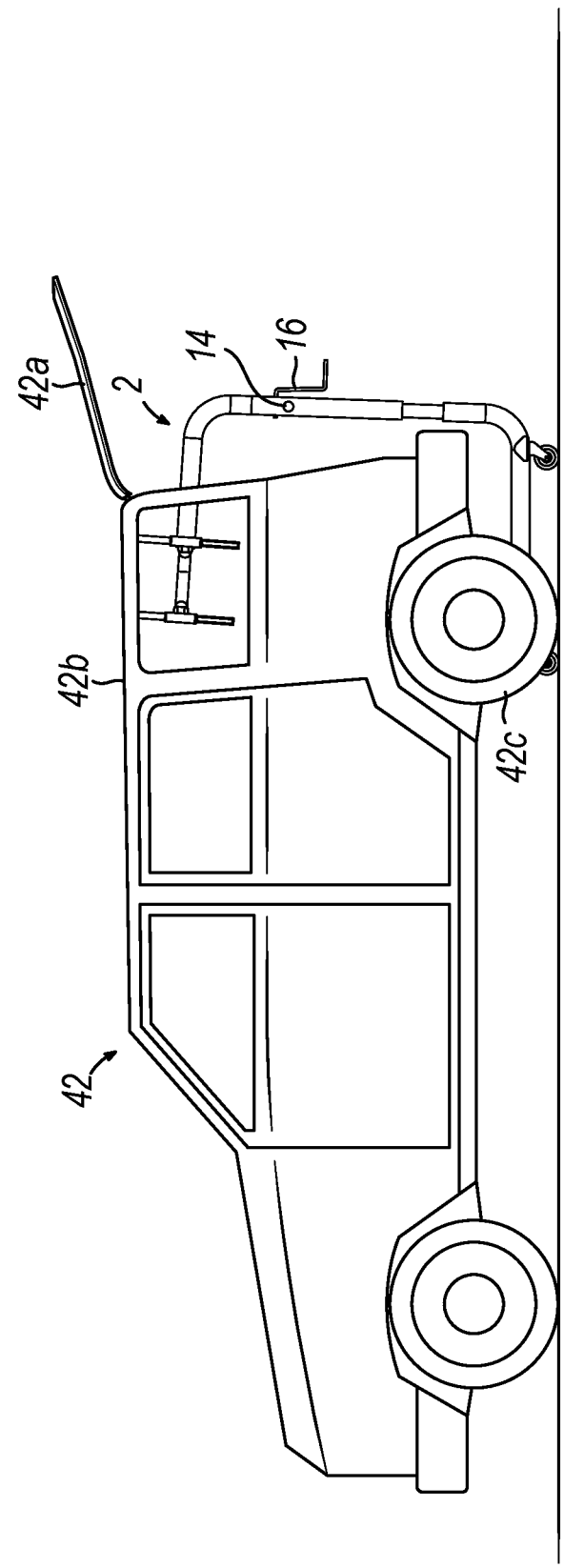
FIG. 3 illustrates the lift of FIG. 1A, engaging the hardtop and having lifted it from the vehicle.

FIGS. 2 and 3 illustrate the use of lift 2. Lift 2 may be moved toward vehicle 42, which has the rear window/hatch 42a of hardtop 42b open so that upper platform assembly 8 may be inserted into vehicle 42 under hardtop 42b. Lower platform assembly 4 may be of any size and shape which is configured to be located relative to vehicle 42 so as to locate upper platform assembly 8 within vehicle 42 underlying hardtop 42b in a position to engage and lift hardtop 40b from vehicle 42. In the embodiment depicted, lower platform assembly 4 is configured to fit under vehicle 42 in-between wheels 42c. Handles 14, if present, may be used to steer lift 2 into a position at which lower platform assembly 4 is disposed under vehicle 42 in-between rear wheels 42c as seen in FIG. 3. In the embodiment depicted, linear actuator 6 may be actuated by hand crank 16, which may be rotated to cause lift 2 to move from a first position at which the tops of supports 38 are low enough to clear the underside of the hardtop so that upper platform assembly may be located within vehicle 42 underlying hardtop 42c to a second position at which supports 38 have lifted hardtop 42c off of vehicle 42 a sufficient distance to withdraw lift 2 from vehicle 42. The first position may be, but is not limited to the fully contracted position and the second position may be, but is not limited to, the fully extended position.

Figure 4:
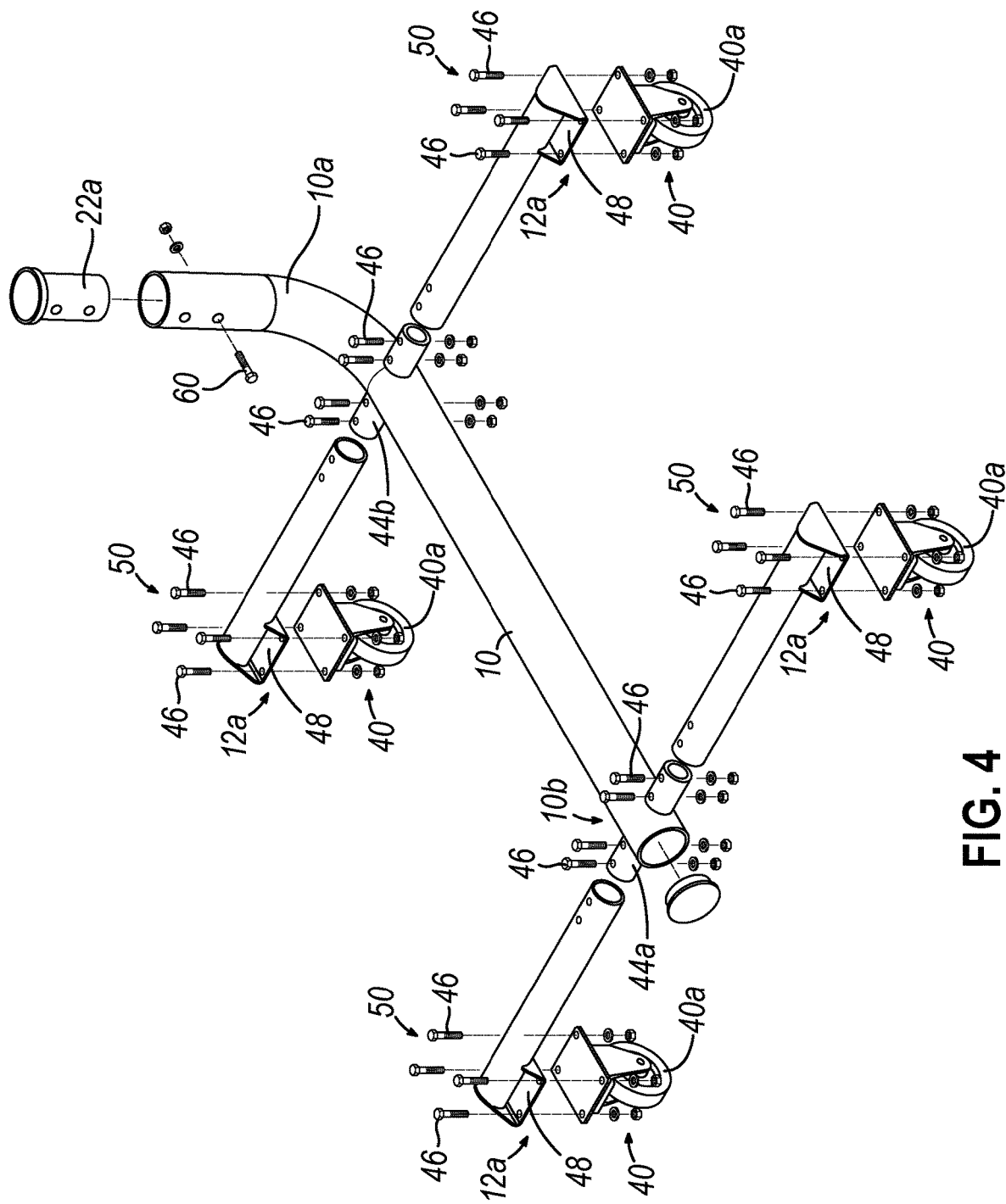
FIG. 4 is an exploded perspective view of the lower platform assembly of the lift of FIG. 1A.

As seen in FIG. 4, in the embodiment depicted lower platform assembly 4 comprises main support 10, bushing 22a, legs 12 which extend transversely from main support 10, and wheel assemblies 40 disposed at distal ends 12a of legs 12. Legs 12 may be attached to main support 10 in any suitable manner which provides a secure connection there between with minimal to no movement at the connection. In the embodiment depicted, there are two supports 44a, 44b connected to and extending to either side of main support 10. Supports 44a, 44b are illustrated as each being one piece and extending through complementarily shaped openings in main support 10. Each support 44a, 44b being one piece provides rigidity and strength, although alternatively each of supports 44a, 44b may be separate pieces. Supports 44a, 44b may be connected to main support 10 in any suitable manner, such as welded. The proximal ends of legs 12 are configured to slip over supports 44a, 44b without excessive radial end play. In the embodiment depicted, the proximal ends of legs 12 and supports 44a, 44b have complimentarily sized and located openings which receive fasteners 46 to allow legs 12 to be securely connected to supports 44a, 44b and concomitantly to main support 10. In the embodiment depicted, fasteners 46 are illustrated as threaded fasteners, washers and nuts, with each leg 12 being connected with two fasteners 46. Any suitable type and number of fasteners may be used which provide suitably minimal to no movement in the connection between leg 12 and main support 10.

Figure 5:
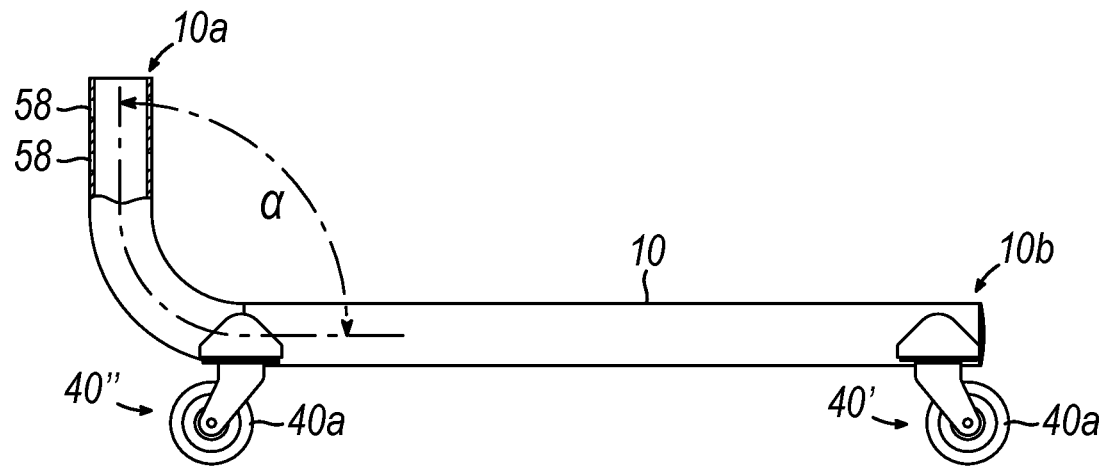
FIG. 5 is a side view of the lower platform assembly of the lift of FIG. 1A.

As also seen in FIG. 5, wheel assemblies 40 are connected to distal ends 12a of legs 12, spaced apart at locations which provide stable support of lift 2 sufficient to prevent toppling while supporting a top. Wheel assemblies 40' carried by legs 12 that extend from distal end 10b are illustrated as being rigid (non-swiveling fork) casters such that they are oriented generally parallel to the longitudinal axis of main support 10. Wheel assemblies 40" carried by the other two legs 12 are illustrated as being swivel casters such that they allow steering of lift 2. Wheel assemblies 40" may have lockable wheels, which allow locking lift 2 in place (via wheel assemblies 40") when a hardtop is being lifted from a vehicle. Wheel assemblies 40' may also have lockable wheels which could, along with wheel assemblies 40", be locked when lift is in a stored location.

Figure 6:
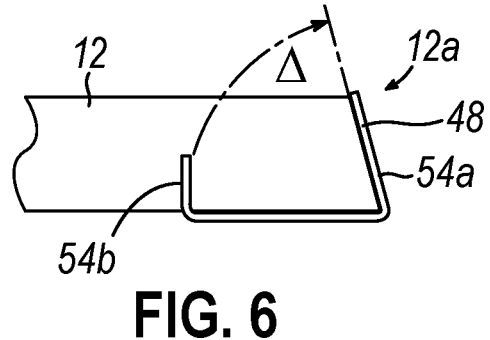
FIG. 6 is a fragmentary side view of the end of a leg tube of the lift of FIG. 1A.
Figure 7:
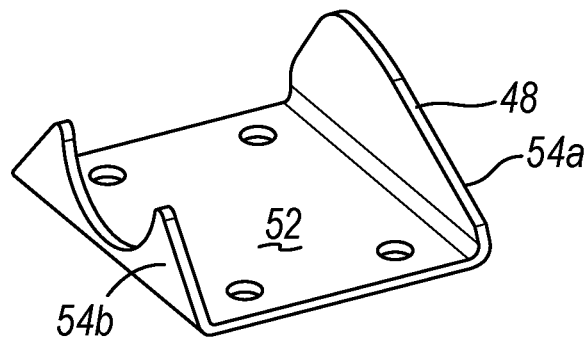
FIG. 7 is a perspective view of the wheel bracket seen in FIG. 5.
Figure 8:
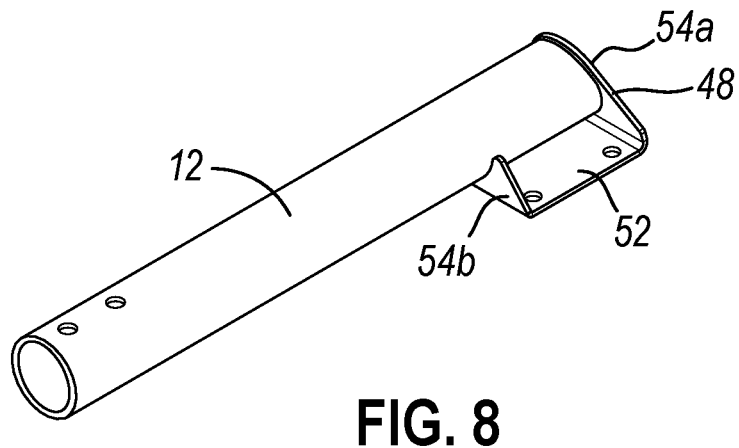
FIG. 8 is a perspective view of a leg tube of the lift of FIG. 1A.

Referring also to FIGS. 6, 7 & 8, at distal end 12a of each leg 12 there is a respective wheel bracket 48 secured to distal end 12a by any suitable method, such as by welding. Wheel assemblies 40' and 40" may be secured to wheel brackets 48 by any suitable manner, such as through the use of fasteners 50. Bracket 48 comprises base 52, to which wheel assemblies 40', 40" may be attached, and flanges 54a, 54b. Flange 54a is disposed at angle A relative to base 52. Distal ends 12a of legs 12 have a complementarily shaped angle such that flange 54a mates to distal end 12a which provides an abutment, such as may be used for welding. Angle A may be any suitable angle. In the embodiment depicted, A is illustrated as 75° which provides a pleasing appearance. Flange 54b includes arcuate portion 54c which is shaped complementarily to leg 12, and provides an abutment which may be used for attachment to leg 12.

Wheel assemblies 40' and 40" may be secured to legs 12 in any suitable manner which provides adequate stability to lift 2. For example, wheel brackets 48 may be omitted and wheel assemblies 40', 40" secured directly to distal ends 12a, such as via a threaded fastener extending from the yokes of wheel assemblies 40', 40" through holes in distal ends 12a.

Figure 9A:
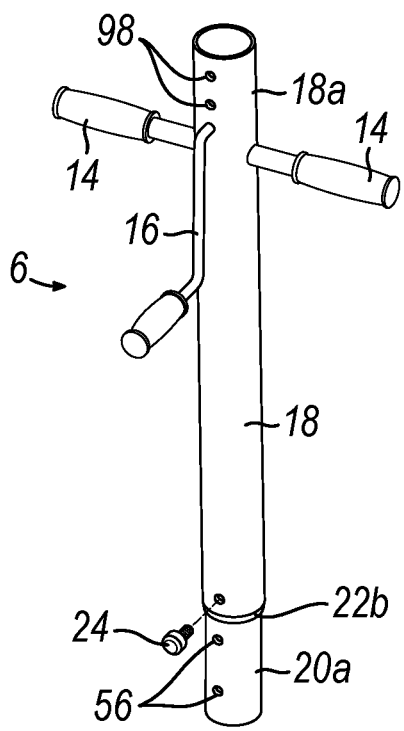
FIG. 9A is a side perspective view of the linear actuator of the lift of FIG. 1A with the linear actuator fully contracted.
Figure 9B:
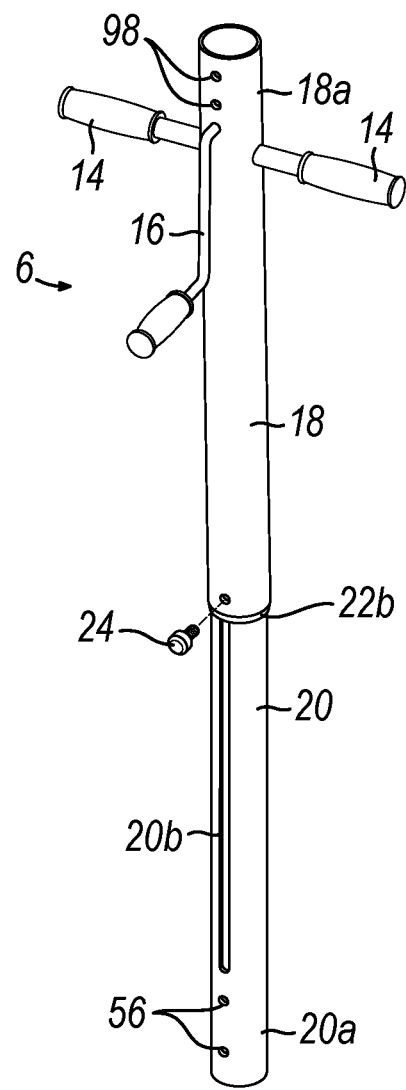
FIG. 9B is a side perspective view of the linear actuator of the lift of FIG. 1A similar to FIG. 8A with the linear actuator in an extended position.
Figure 10A:
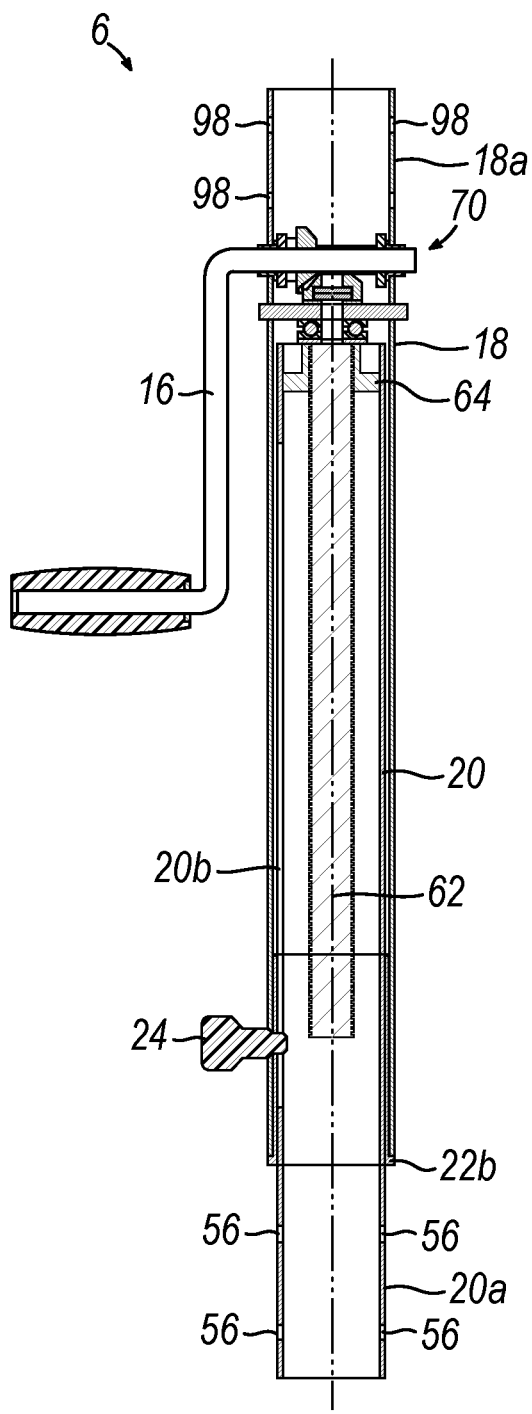
FIG. 10A is a side cross-sectional view of the linear actuator of the lift of FIG. 1A.
Figure 10B:
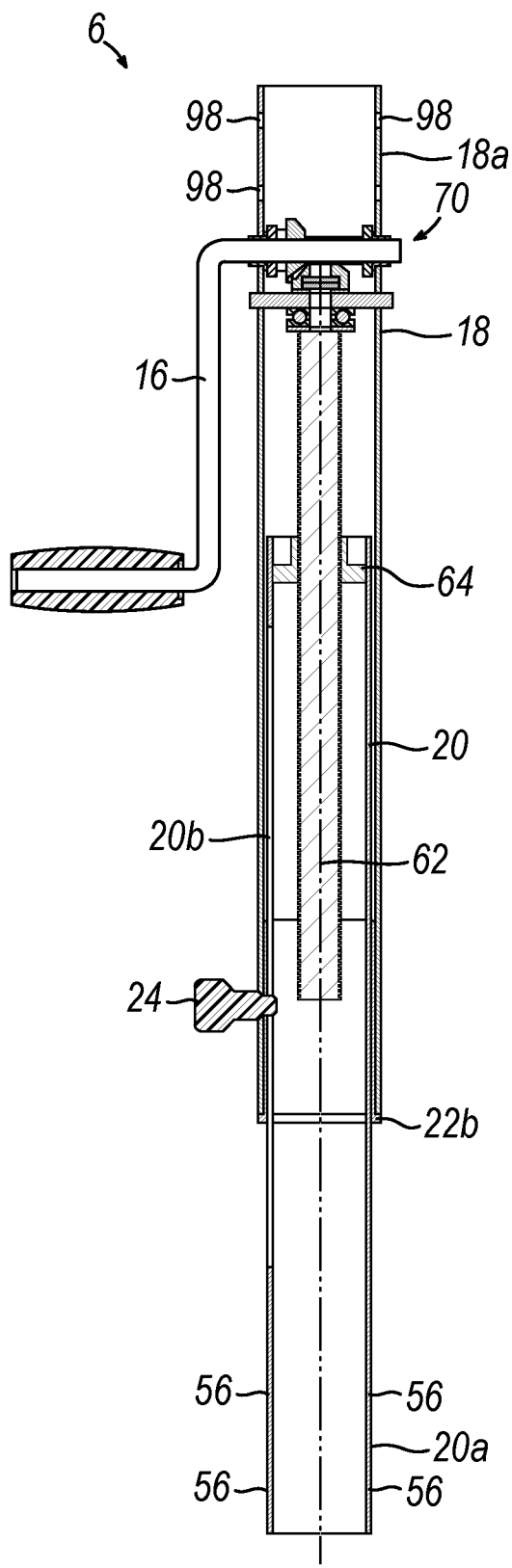
FIG. 10B is a side cross-sectional view of the linear actuator of the lift of FIG. 1A similar to FIG. 10A with the linear actuator in the extended position.

Referring to FIGS. 9A, 9B, 10A and 10B, linear actuator 6 is illustrated separate from lower platform assembly 4 and upper platform assembly 8. FIGS. 9A and 10A illustrate linear actuator 6 in a fully contracted position. FIGS. 9B and 10B illustrate linear actuator 6 in extended positions. Lower portion 20a of inner actuator tube 20 is configured to be inserted into bushing 22a. Lower portion 20a comprises a plurality of openings 56 which may be aligned with respective openings 58 in bushing 22a during assembly when lower portion 20a is inserted into bushing 22a with linear actuator 6 in the fully contracted position. Respective fasteners 60 may be disposed through respective openings 56, 58 to secure lower portion 20a (and concomitantly linear actuator 6) to main support (and concomitantly to lower platform assembly). In the embodiment depicted, fasteners 60 are illustrated as threaded fasteners, washers and nuts, with lower portion 20a being connected with two fasteners 60. Any suitable type and number of fasteners may be used which provide suitably minimal to no movement in the connection between lower portion 20a of inner actuator tube 20 of linear actuator 6 and main support 10.

In the embodiment depicted, linear actuator 6 comprises a jack screw which comprises jack shaft 62 which is rotatably supported by jack nut 64. Jack shaft 62 is rotatable about its longitudinal axis 62a which is generally aligned and coincident with the centerline of linear actuator 6 (and concomitantly with the centerlines of outer actuator tube 18 and inner actuator tube 20). Jack shaft 62 comprises external threads 66 and jack nut 64 comprises internal threads 68 of any suitable configuration, shaped complementary to each other.

Figure 11:
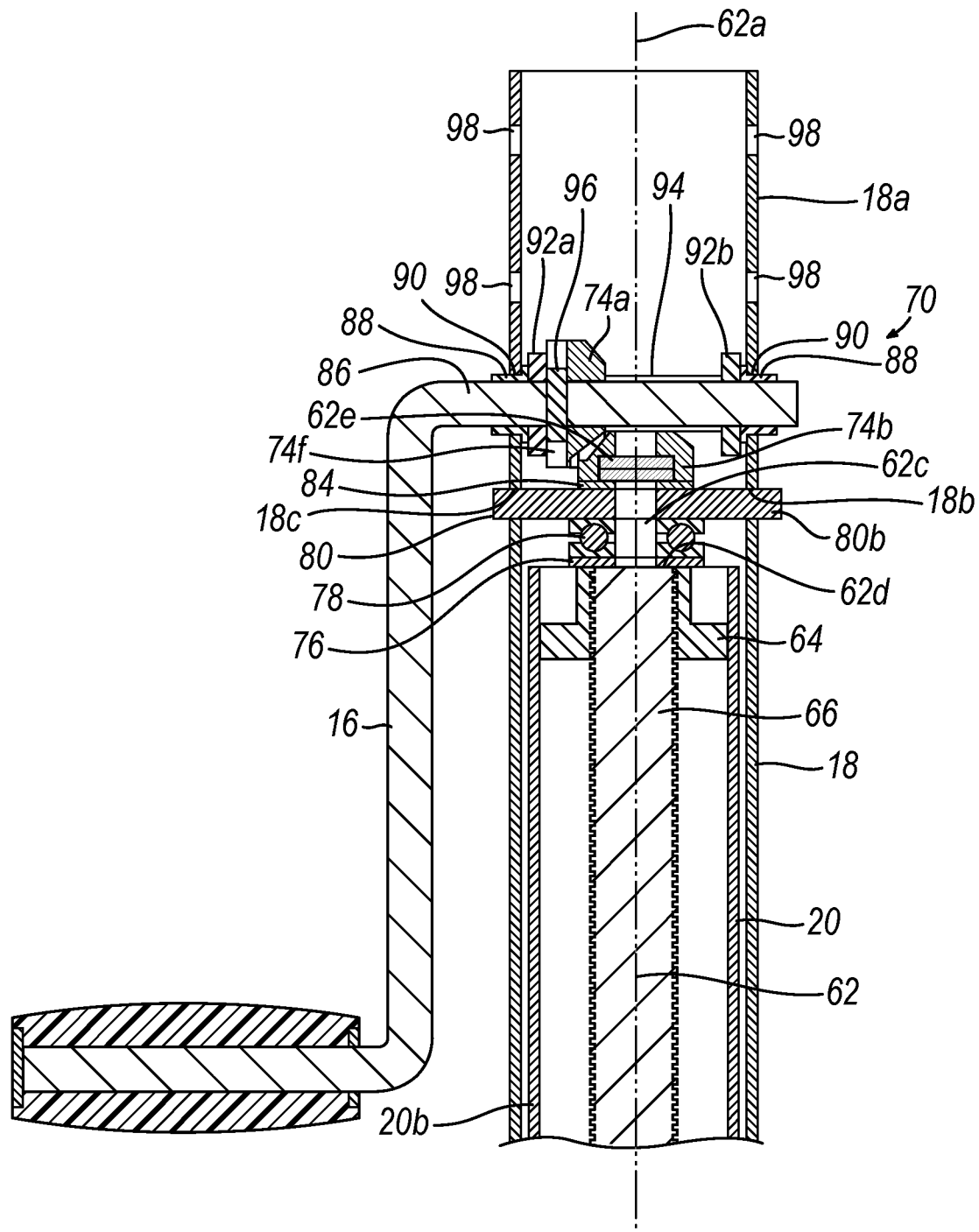
FIG. 11 is an enlarged fragmentary side cross-sectional view of the linear actuator of the lift of FIG. 1A.
Figure 12:
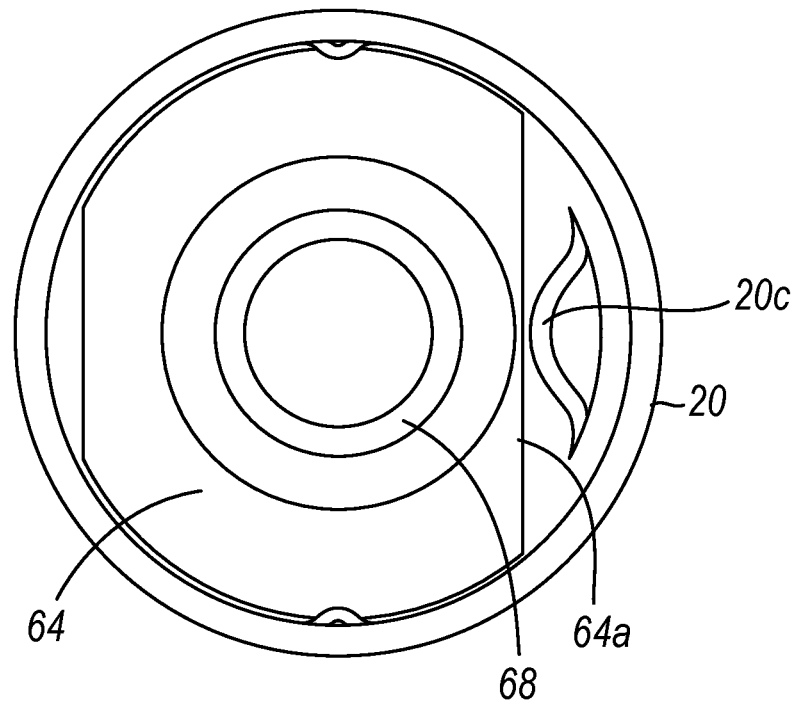
FIG. 12 is a top, plan view of the upper end of the inner actuator tube and the jack nut of the linear actuator of the lift of FIG. 1A.

Referring also to FIGS. 11 & 12, jack nut 64 is non-rotatably and non-axially movable connected to inner actuator tube 20, such that rotation of jack shaft 62 relative to jack nut 64 results in jack nut 64 moving along axis 62a. Jack nut 64 may be secured to inner actuator tube 20 by any suitable method or structure. By way of example, in the embodiment depicted, as seen in FIG. 12, jack nut 64 may be staked in place by upsetting/deforming portions of inner actuator tube 20, preventing rotation and axial movement relative to inner actuator tube 20. Jack nut 64 is illustrated with flat 64a which when engaged with stake 20c prevents relative rotation. As mentioned above, anti-rotation pin 24 extends into slot 20b, preventing rotation of inner actuator tube 20, such that rotation of jack shaft 62 moves jack nut 64 along axis 62a.

Figure 13:
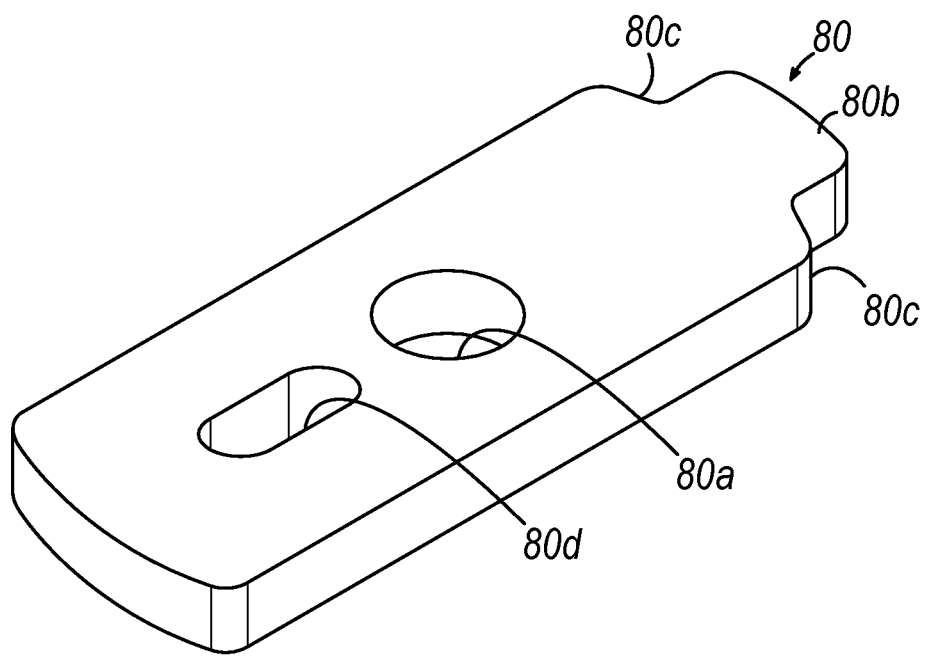
FIG. 13 is a perspective view of the jack support plate of the linear actuator of the lift of FIG. 1A.

Upper end 62b may comprise a generally cylindrical drive extension 62c having a smaller diameter than threads 66, extending up from shoulder 62d. Shoulder 62d supports washer 76 which in turn engages the lower race of bearing 78. As illustrated in FIG. 13, support plate 80 includes tab 80b which extends through complementarily shaped opening 18b of outer actuator tube 18. Shoulders 80b extend from the base of tab 80b to the wider body portion of support plate 80 and function as a stop against the inner surface of outer actuator tube 18. Disposed opposite opening 18b is opening 18c, which has a width and thickness slightly larger than the width and thickness of support plate 80 such that support plate 80 may be inserted there through to a position at which tab 80b extends through opening 18b. Drive extension 62c extends through opening 80a of outer actuator tube support plate 80, thereby retaining support plate 80 in the position illustrated in FIG. 11. As jack shaft 62 is rotated in a first direction, upper end 62b moves upwardly, the upper raceway of bearing 78 is urged upwardly against the lower surface of support plate 80, which in turn is urged upwardly against outer actuator tube 18 at openings 18b and 18c, and linear actuator 6 is extended. When jack shaft 62 is rotated in a second direction, opposite of the first direction, linear actuator 6 is contracted.

Figure 14:
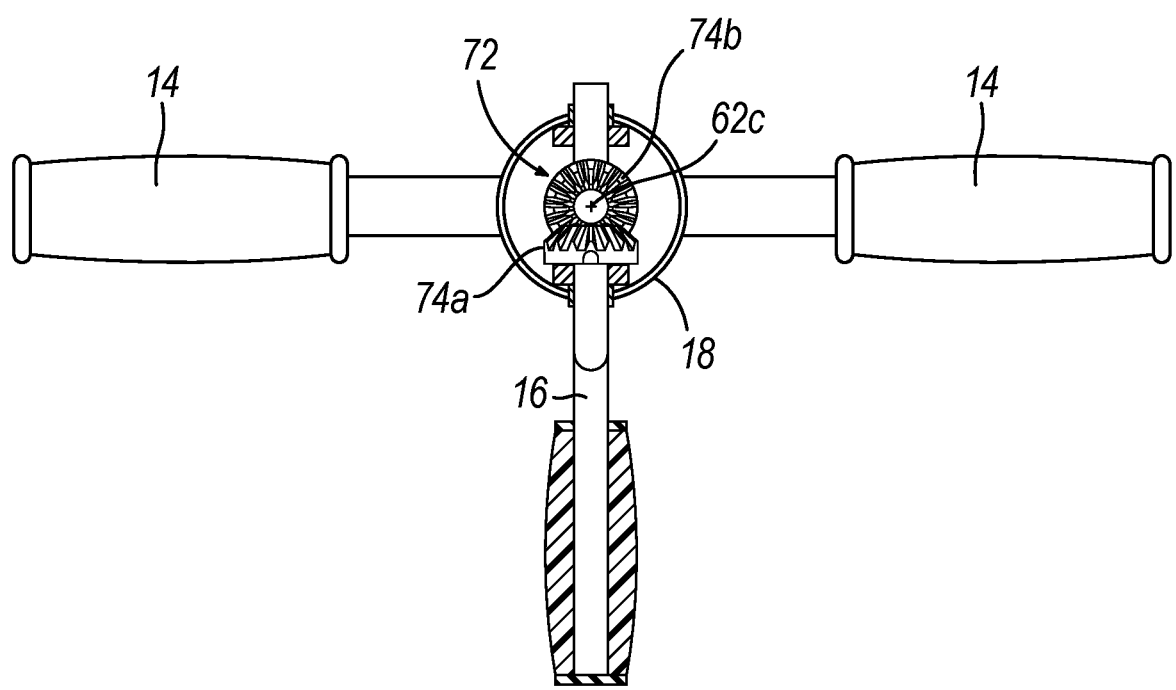
FIG. 14 is a top view of the linear actuator of the lift of FIG. 1A with a portion of the hand crank omitted for clarity.
Figure 16:
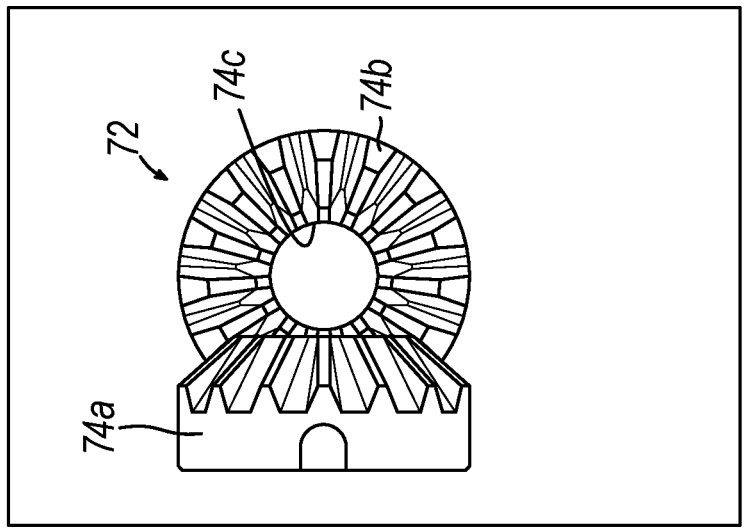
FIG. 16 is a top view of the jack gear set of the linear actuator of the lift of FIG. 1A.

Outer actuator tube 18 supports drive mechanism 70 which is operably connected to rotate jack shaft 62. Any suitable drive mechanism may be used, such as for example, that illustrated in the depicted embodiment which comprises gear assembly 72 (see FIG. 14). Gear assembly may, as illustrated, comprise a pair of bevel gears 74 comprising a drive bevel 74a and a driven 74b having complementary shaped meshing gear teeth. In the embodiment depicted, driven bevel 74b includes opening 74c which receives drive extension 62c. To non-rotatably connect driven bevel 74b to drive extension 62c, driven pin 82 may be disposed through opening 62e of drive extension 62c. Driven bevel 74b may include pin slot 74d which is sized to receive driven pin 82 when driven bevel 74c is disposed about drive extension 62c as seen in FIGS. 10A, 10B and 11. In this embodiment, driven pin 82 may have a slip fit relative to opening 62d so as to facility assembly, with the closed ends of pin slot 74d retaining driven pin 82 in place when driven bevel 74b is disposed about drive extension 62c. Washer 84 may be disposed between support plate 80 and driven bevel 74b.

Drive bevel 74a is disposed approximately 90° relative to driven bevel 74b. Drive shaft 86, which in the embodiment depicted is part of hand crank 16, is rotatably supported by spaced apart steel bearings 88 disposed in openings 90 through outer actuator tube 18. The stack up of components disposed about drive shaft 86 maintain bearings 88 in openings 90. Disposed adjacent bearings 88 are washers 92a, 92b. Drive bevel 74a is disposed about drive shaft 86, with its teeth engaged with the teeth of driven bevel 74b. Sleeve 94 is disposed about drive shaft 86 extending between washer 92b and driven bevel 74a.

Figure 15:
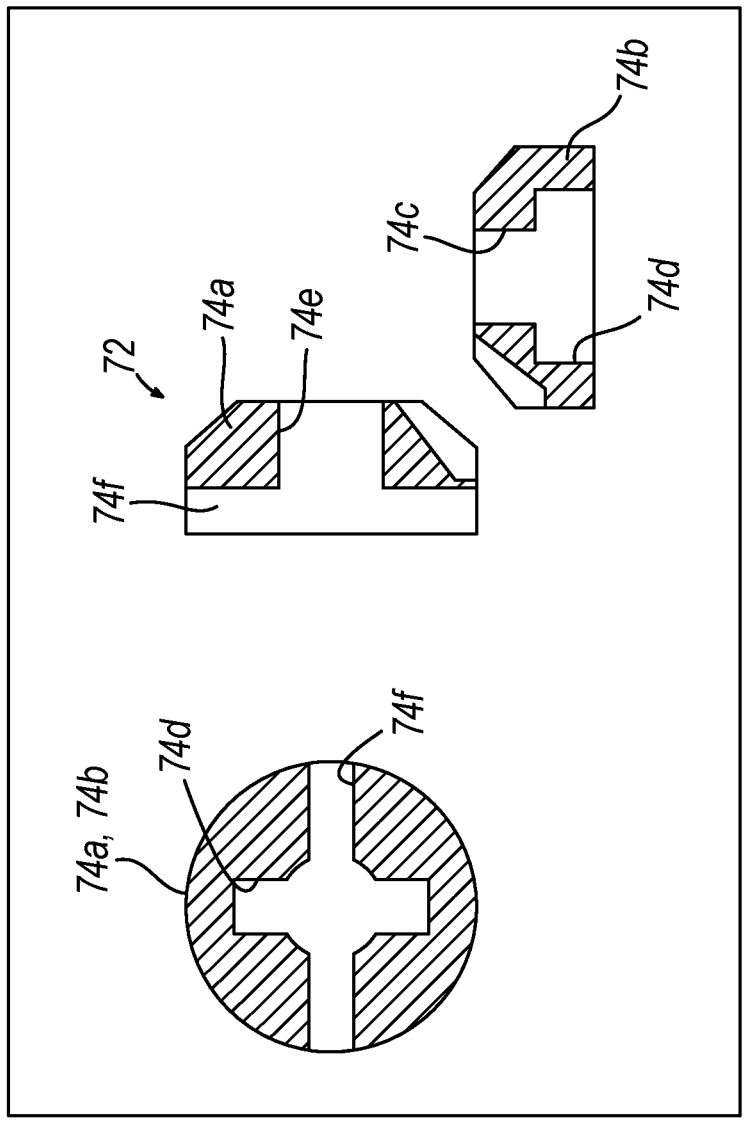
FIG. 15 is a side view and side cross-sectional view of the drive gear and side and a side cross-sectional view of the driven gear of the jack gear set of the linear actuator of the lift of FIG. 1A.

Drive pin 96 extends through an opening through drive shaft 86, disposed in pin slot 74f of drive bevel 74a. Pin slot 74f is open on each end, as seen in FIG. 15, allowing drive pin 96 to be installed after all of the components are disposed about drive shaft 86. The fit between drive pin 96 is such that drive pin 96 is retained in the opening through drive shaft 86. Once assembled as described, drive pin 96 must be removed in order to withdraw drive shaft 86 and remove the components disposed about drive shaft 86. To facilitate removal of drive pin 96, support plate 80 may include slot 80d to provide space for drive pin 96 to be pressed or driven through the opening through drive shaft 86. Drive pin 96 may be any suitable pin type, such as a roll pin or a pin having a larger diameter, such as rolled splines, in its middle than at either end.

Drive bevel 74a and driven bevel 74b have several features in common, particularly the gear teeth and centrally disposed openings 74c, 74e. In the embodiment depicted, pin slot 74d is configured differently than pin slot 74f. Thus, as illustrated in FIG. 15A, drive bevel 74a and driven bevel 74b may be an identical part, with pin slot 74d and pin slot 74f formed in the bottom thereof, reducing the number and cost of needing a different part for each.

In the embodiment depicted, drive shaft 86 is illustrated as of unitary construction with hand crank 16, although it may be a separate component with a suitable connection to hand crank 16. Any suitable structure or means may be used to cause drive shaft 86 to rotate, such as an external motor. Additionally, drive mechanism 70 could be configured as an internal motor operably disposed to cause rotation of jack shaft 62.

Figure 17:
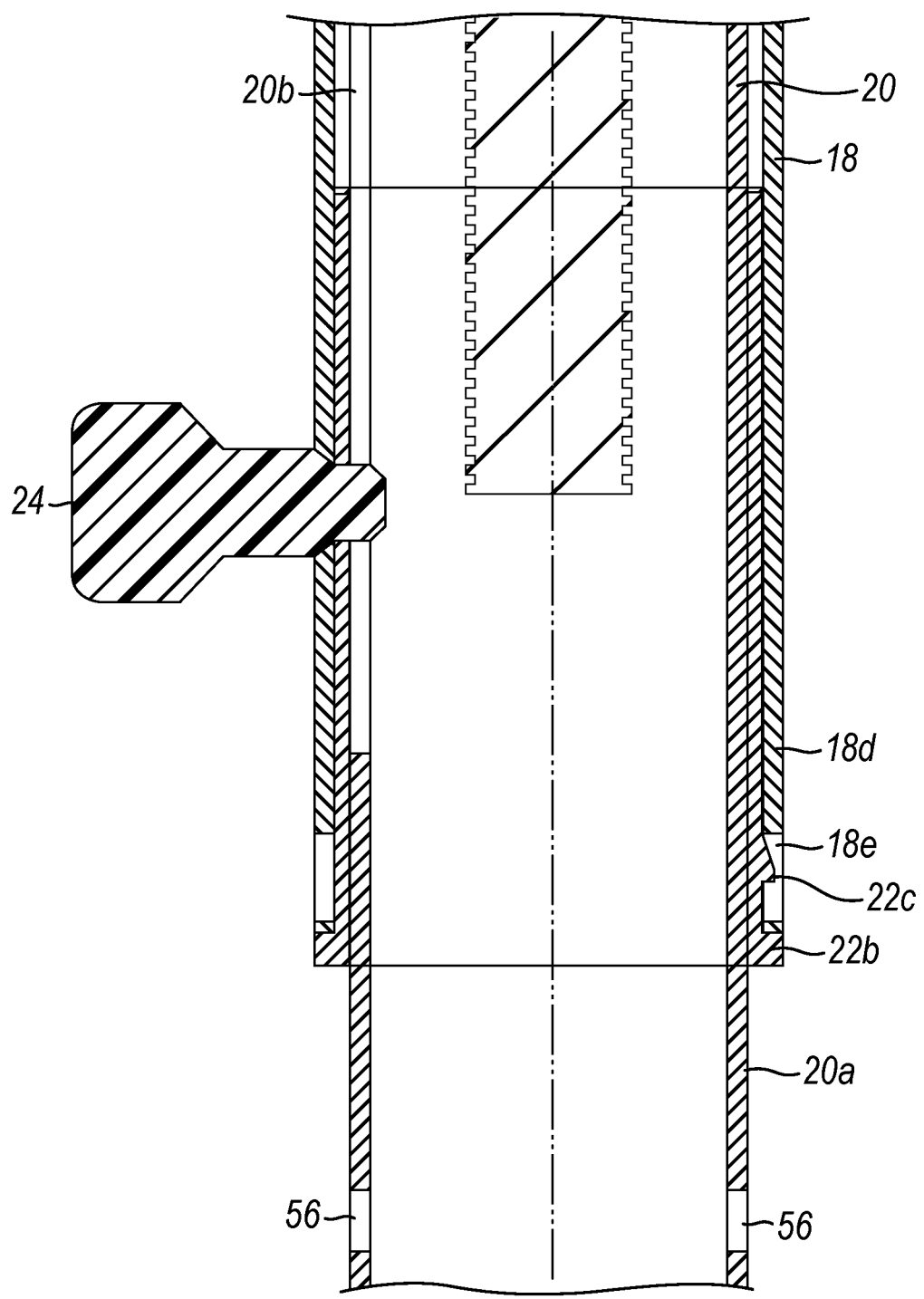
FIG. 17 is an enlarged fragmentary side cross-sectional view of the lower end of the linear actuator of the lift of FIG. 1A.
Figure 18:
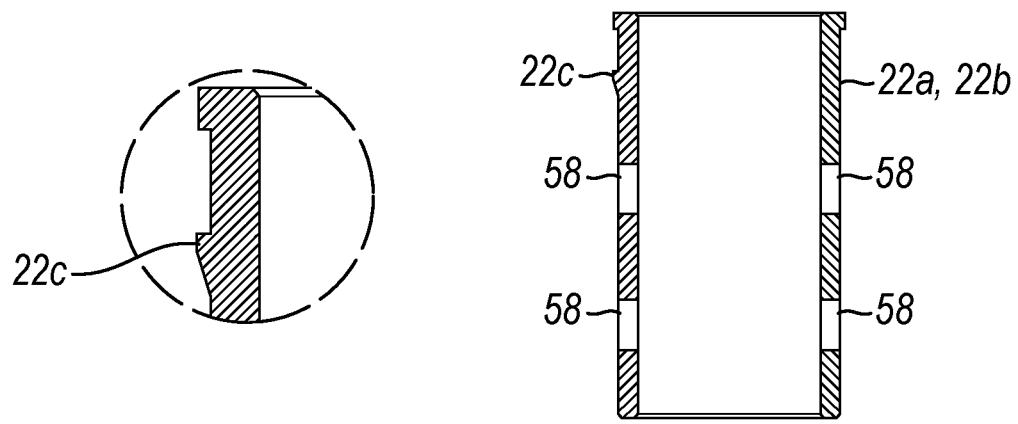
FIG. 18 is a cross-sectional view of the bushing of the linear actuator of the lift of FIG. 1A and of the bushing of the lower platform assembly of the lift of FIG. 1A.
Figure 19:
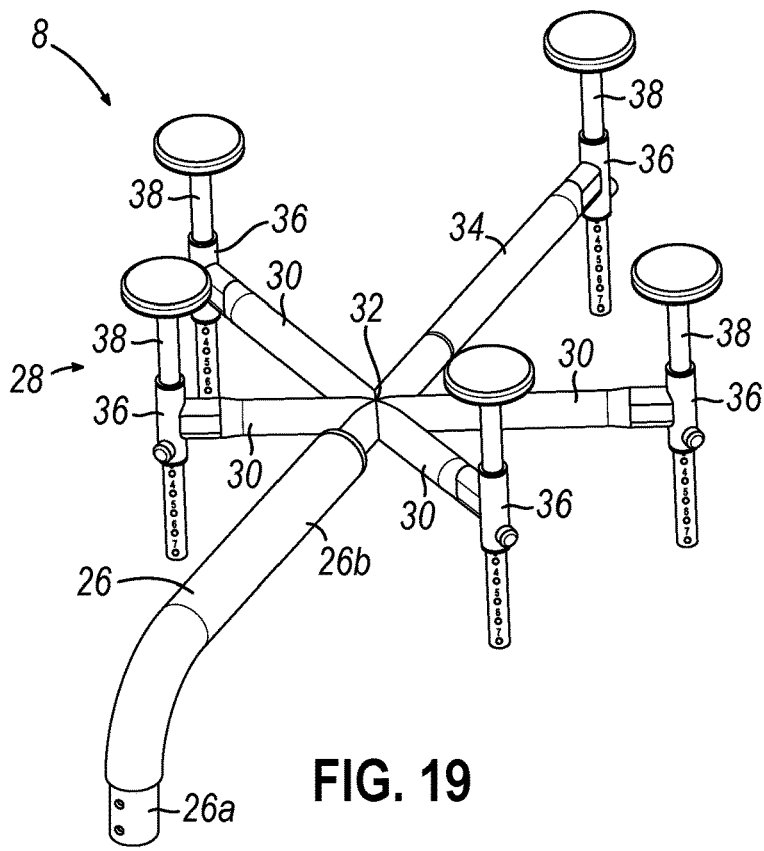
FIG. 19 is a perspective view of the upper platform assembly of the lift of FIG. 1A.
Figure 20:
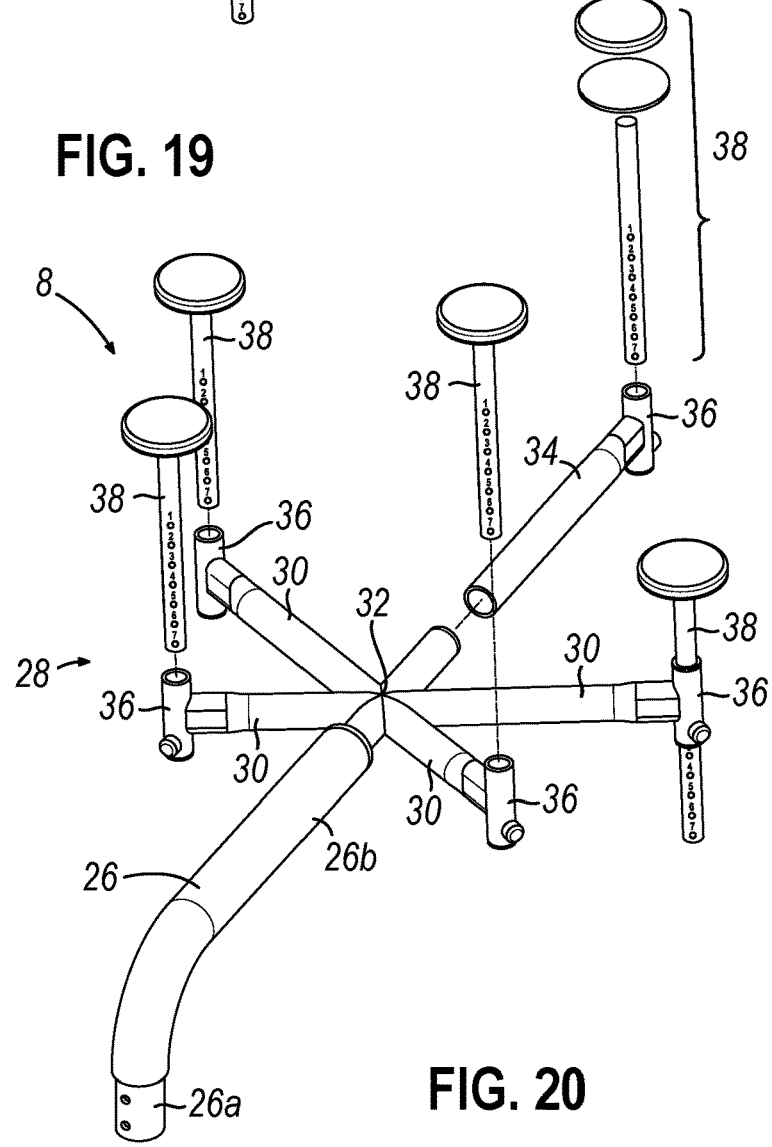
FIG. 20 is an exploded view of the upper platform assembly of the lift of FIG. 1A.
Figure 21:
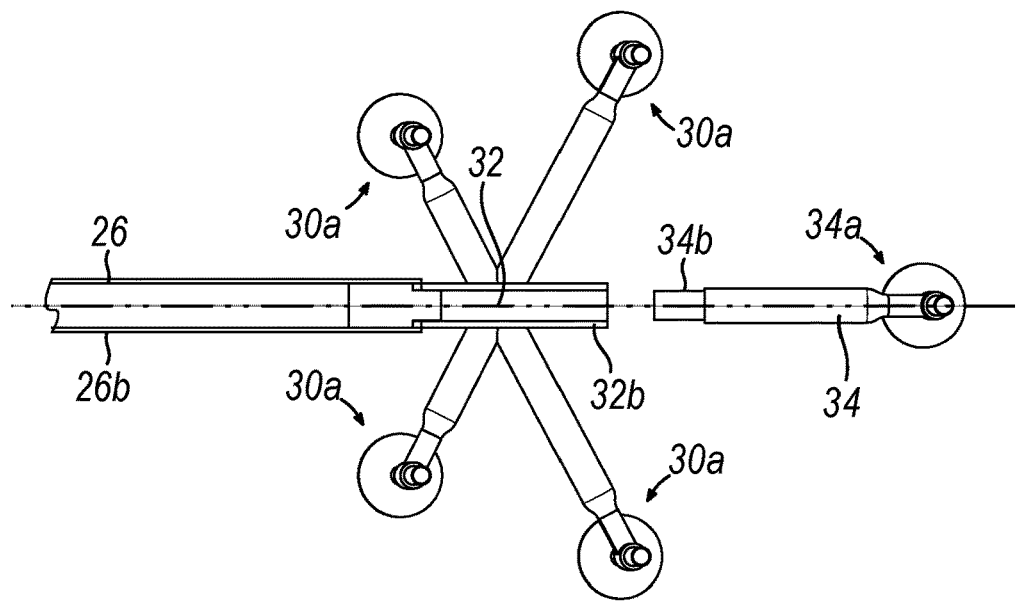
FIG. 21 is a top plan view of the hub assembly of the upper platform assembly of the lift of FIG. 1A with the removable support arm exploded from the rest of the hub assembly.
Figure 22:
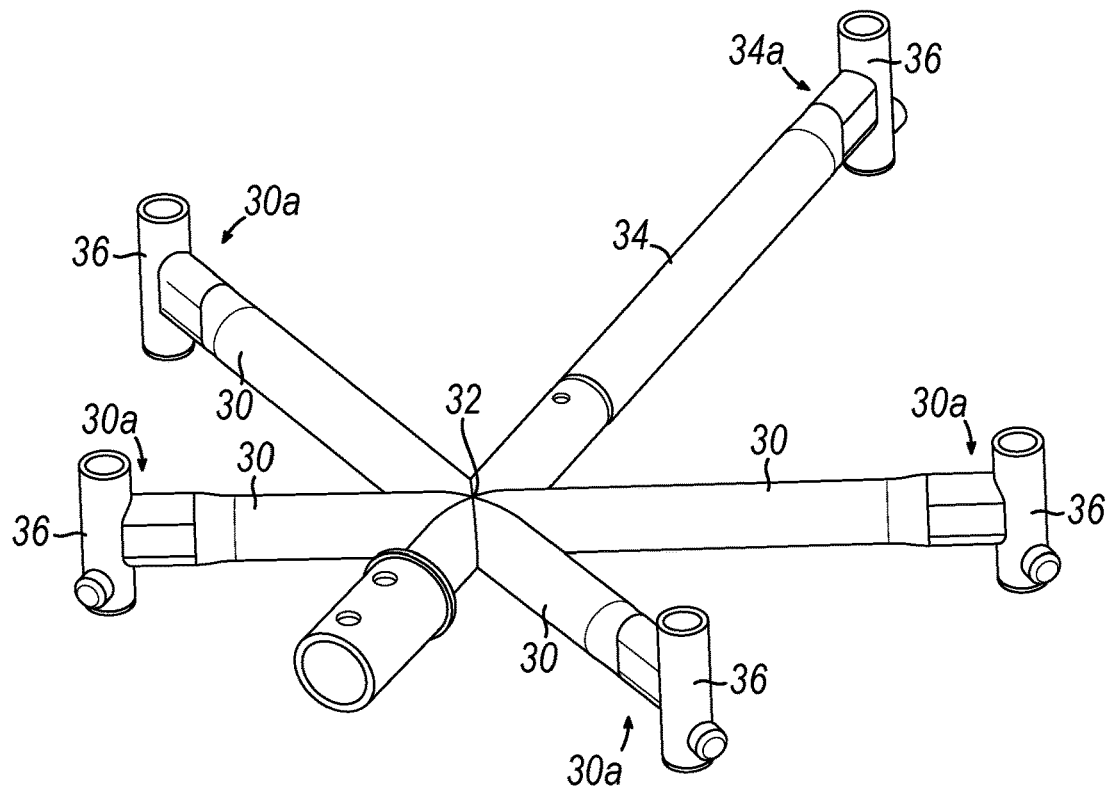
FIG. 22 is a perspective view of the hub assembly of the upper platform assembly of the lift of FIG. 1A, with the removable support arm connected.

Referring to FIG. 17, lower portion 20a of inner actuator tube 20 and lower end 18d are illustrated in cross-section. Bushing 22b is disposed inside of outer actuator tube 18, retained by tab 22c extending into opening 18e. Bushings 22a and 22b may be configured the same, as illustrated in FIG. 18. As seen in FIG. 4, upper end 10a may include opening 10b to receive tab 22c of bushing 22a. Tab 22c is disposed on flexible leg 22d which allows tab to be depressed when installing or removing bushings 22a, 22b.

Figure 23:
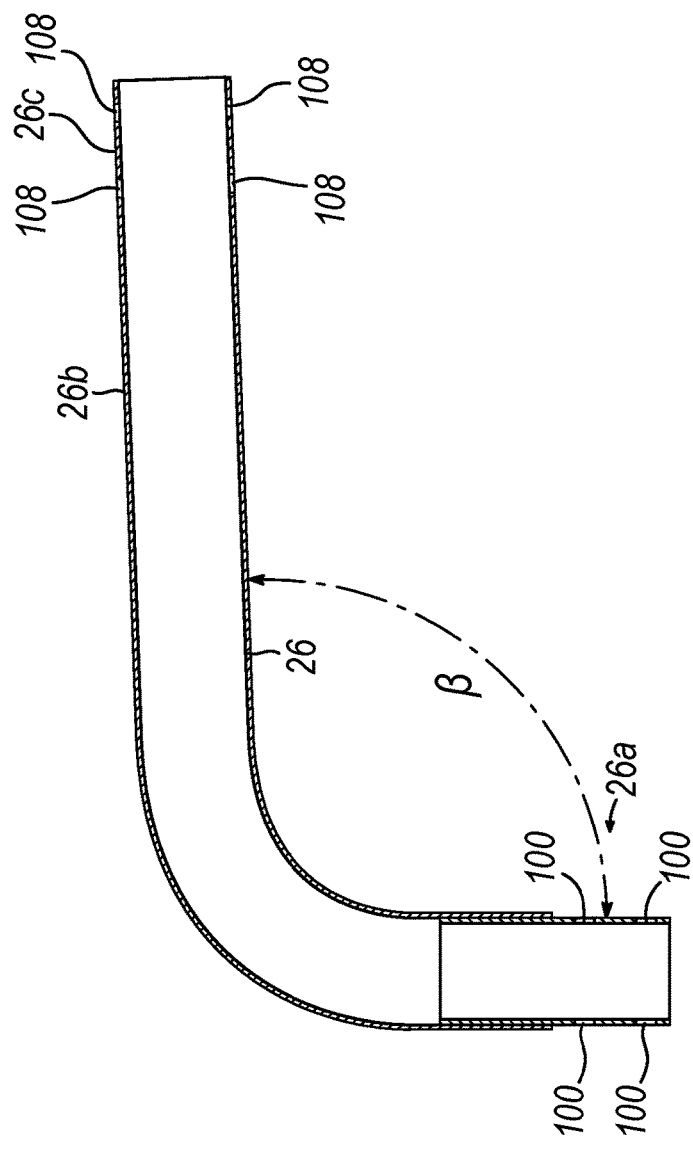
FIG. 23 is a side cross-sectional view of the elbow of the upper platform assembly of the lift of FIG. 1A.

FIGS. 19-25 illustrate upper platform 8 and its components, which have been described above. Lower end 26a of upper elbow assembly 26 is disposed inside of upper end 18a of outer actuator tube 18. As illustrated in FIG. 23, lower end 26a may be configured as an insert which is secured to the tube which forms the rest of upper elbow assembly 26. For stability, the outer diameter of lower end 26a may conform closely to the inner diameter of upper end 18a as is suitable for stability. For example the clearance there between may be about 0.5 mm. Upper elbow assembly 26 may be secured to linear actuator 6 by fasteners disposed through openings 98 of outer actuator tube 18 and openings 100 of lower end 26a.

Figure 24:
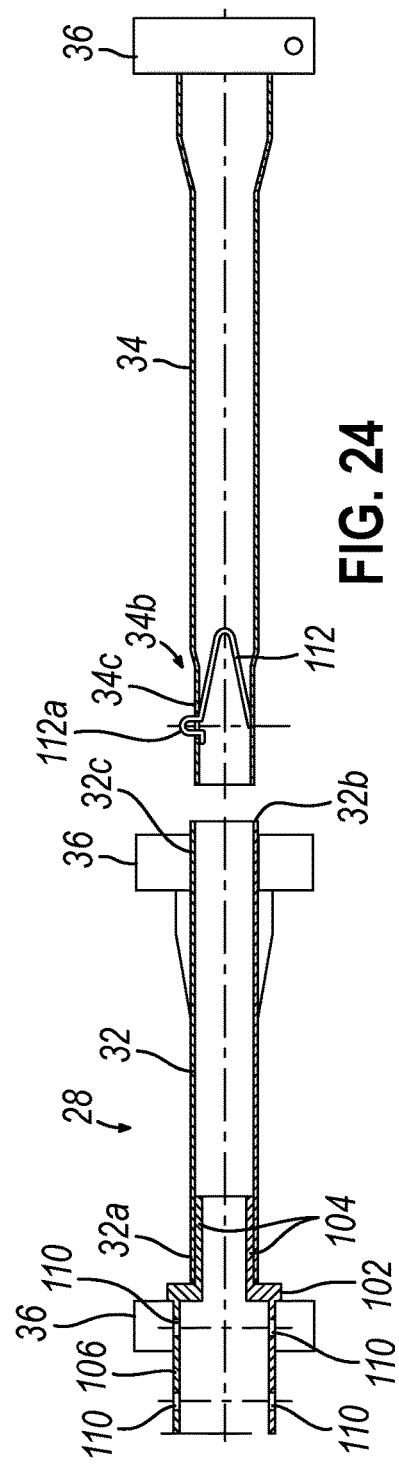
FIG. 24 is a side cross-sectional view of the removable arm and the mating receiver of the hub assembly of the upper platform assembly of the lift of FIG. 1A.

FIG. 24 illustrates hub assembly 28 and connector 102 in cross-section. Connector 102 includes extension 104 which is shaped complementarily to and in close conformity to size with the interior of tubular end 32a of hub 32. Connector 102 is securely connected to hub 32 by any suitable method, such as by welding. Opposite end 106 of connector 102 is shaped complementarily to and in close conformity to size with the interior of end 26c of elbow assembly 26. Connector 102 may be configured to be disposed inside of end 26c and securely connected thereto with fasteners extending through openings 108 of end 26c and openings 106 of connector 102.

FIG. 24 also illustrates removable arm 34 aligned with end 32b of hub 32. End 34b of removable arm 34 is shaped complementarily to the interior of end 32b, with sufficient clearance to be inserted therein while a hardtop is supported by arms 30. Disposed in the interior of end 34b is spring 112 with button 112a extending through opening 34c. Removable arm 34 may connected to hub 32 by inserting end 34b into end 32b while depressing button 112a (or end 32b may be configured to depress button 112a) and sliding the two parts together until button 112a reaches and extends through opening 32c. To remove removable arm 34, button 112a may be depressed at opening 32c and removable arm 34 withdrawn, such as prior to reinstalling the hardtop.

Figure 25:
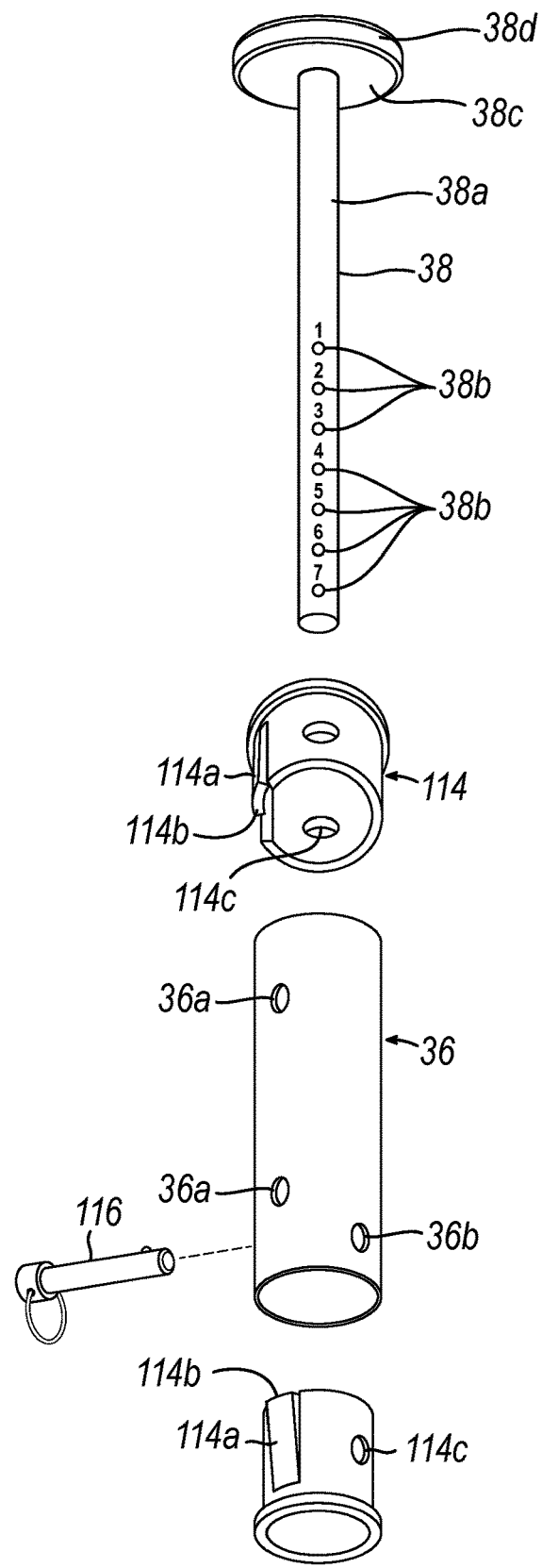
FIG. 25 is an exploded perspective view of a support carrier, bushings, support and quick release pin of the upper platform assembly of the lift of FIG. 1A.
Figure 26:
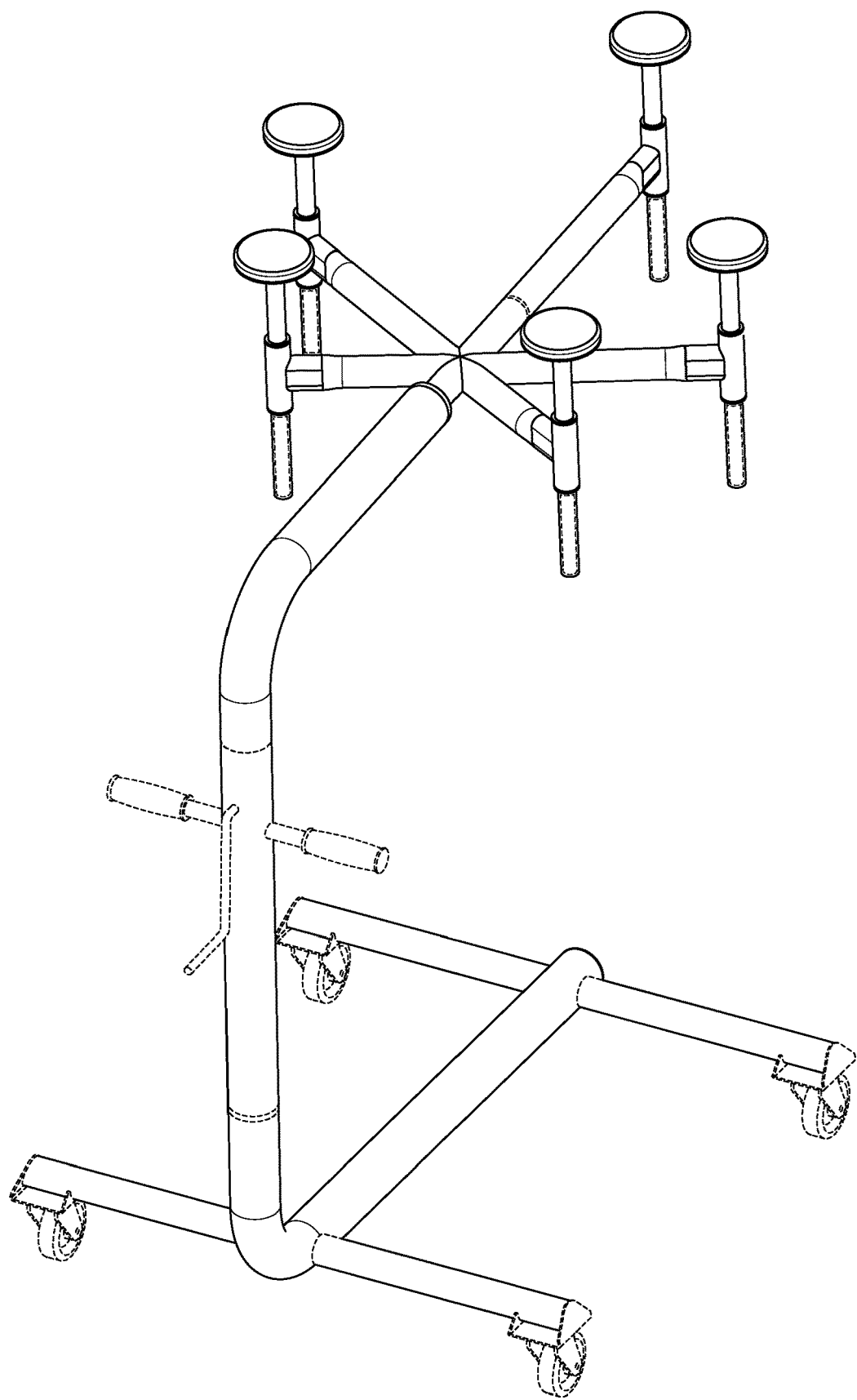
FIG. 26 is a perspective view of the lift of FIG. 1A.
Figure 27:
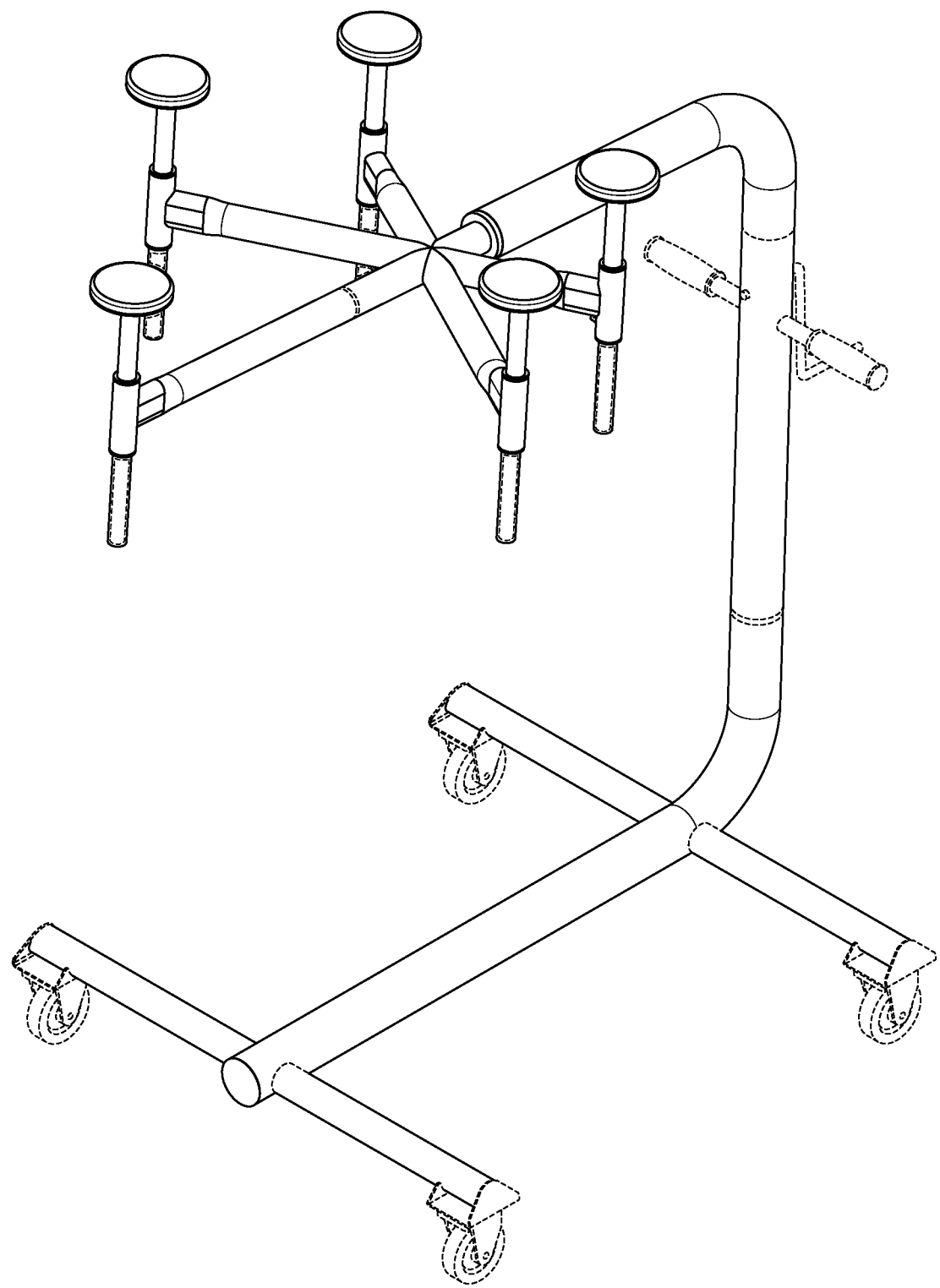
FIG. 27 is another perspective view of the lift of FIG. 1A.
Figure 28:
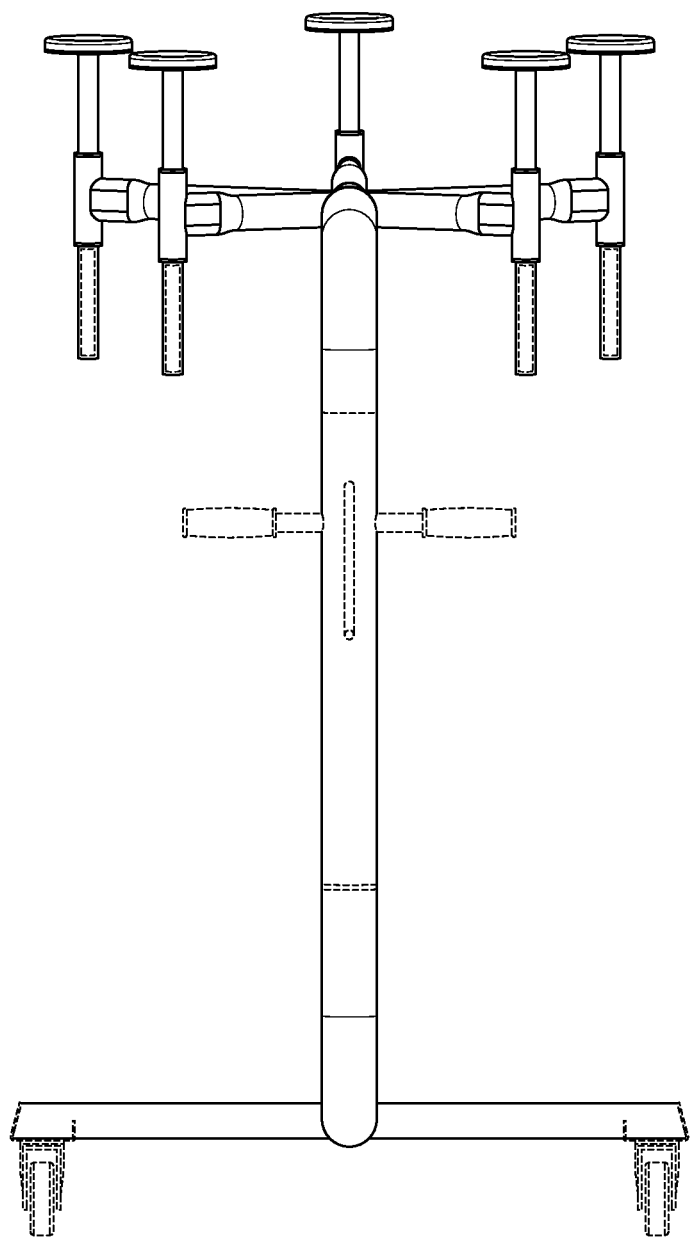
FIG. 28 is a rear elevational view of the lift of FIG. 1A.
Figure 29:
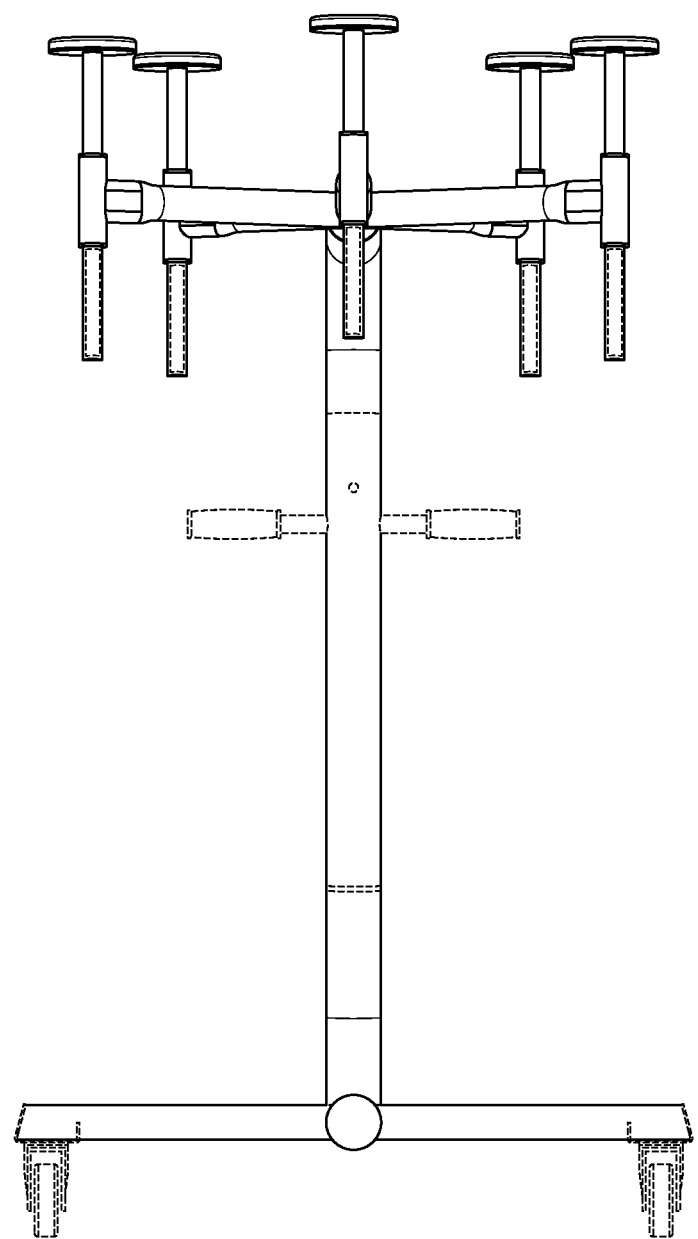
FIG. 29 is a front elevational view of the lift of FIG. 1A.
Figure 30:
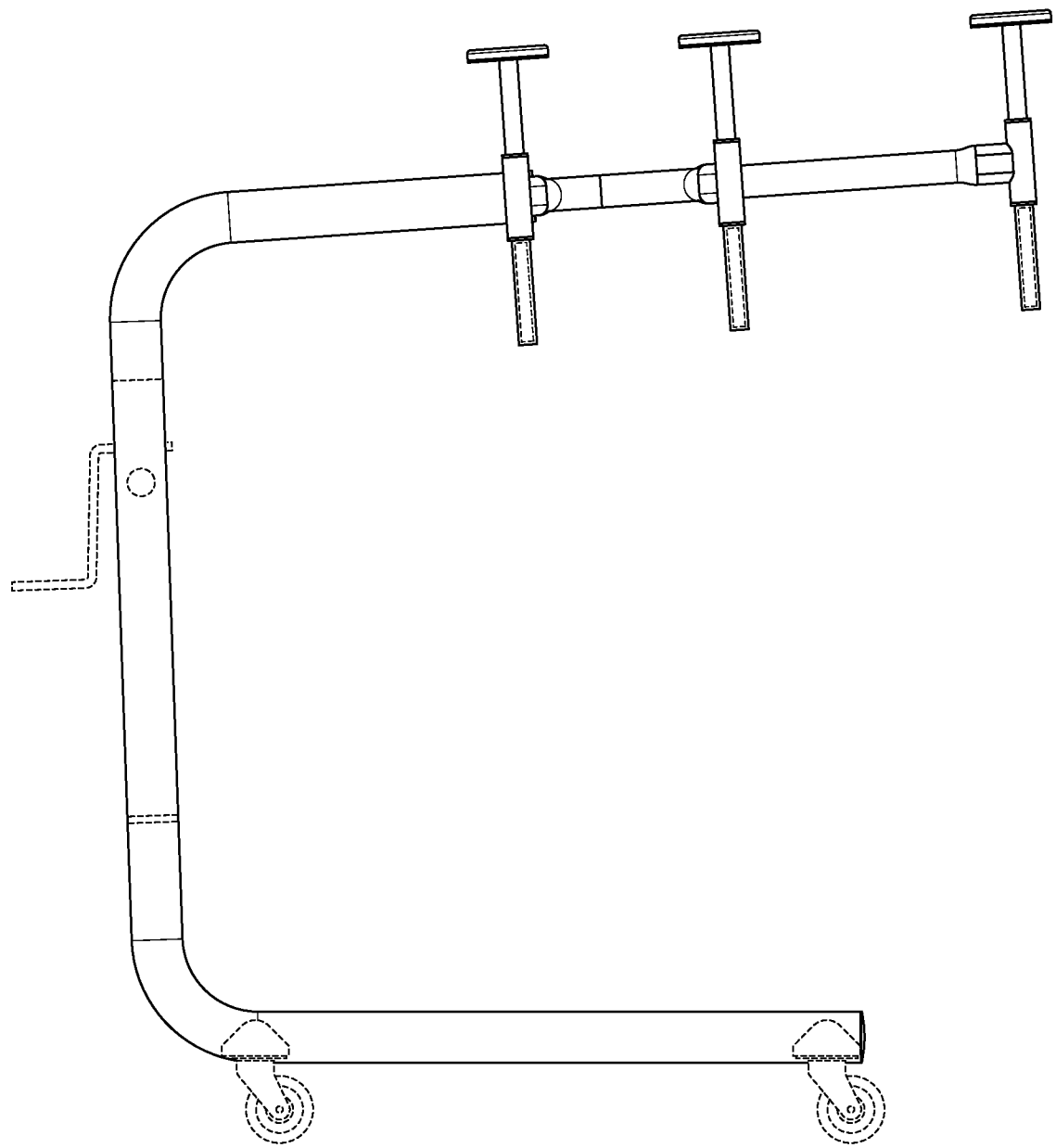
FIG. 30 is a right elevational view of the lift of FIG. 1A.
Figure 31:
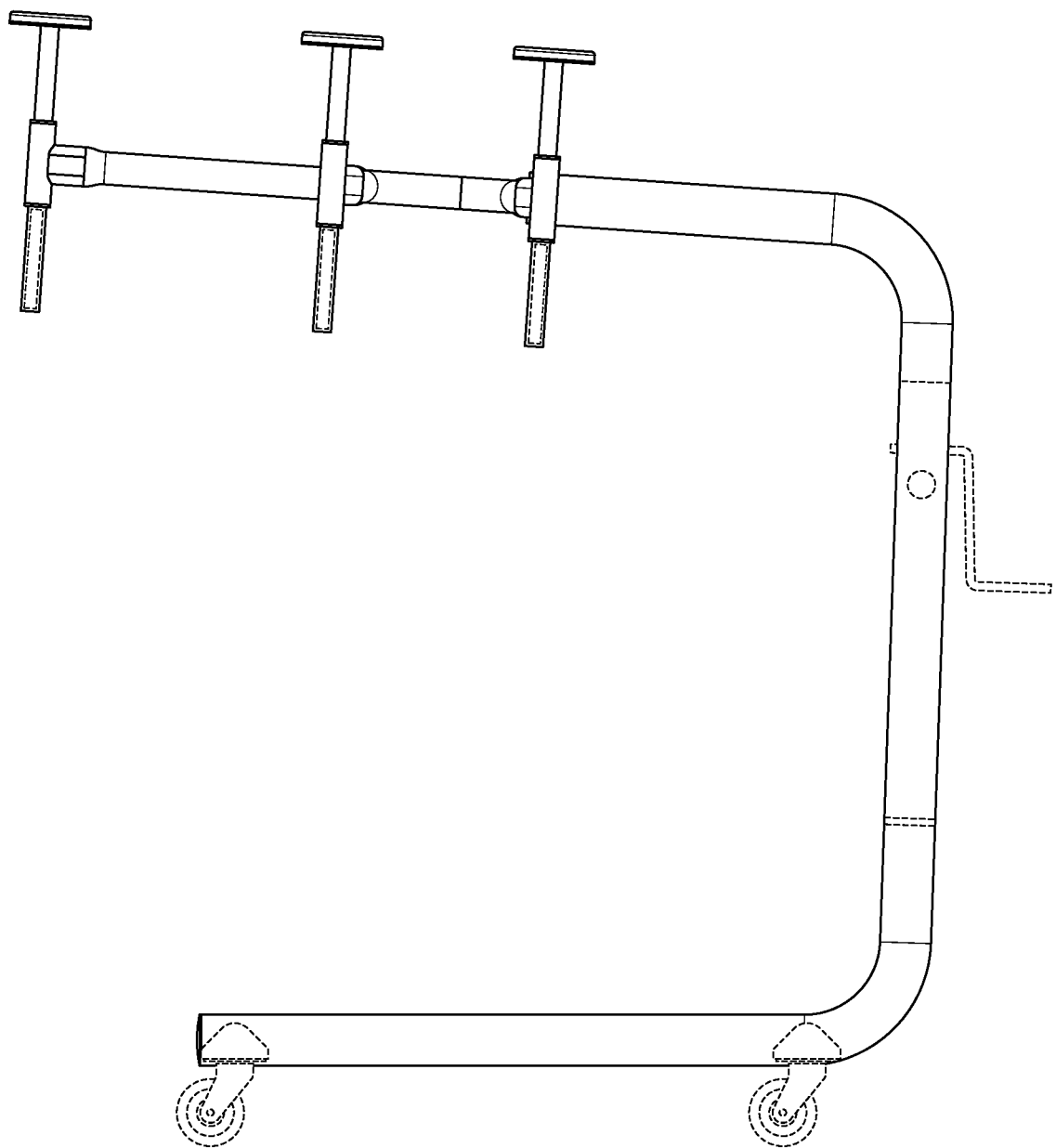
FIG. 31 is a left elevational view of the lift of FIG. 1A.
Figure 32:
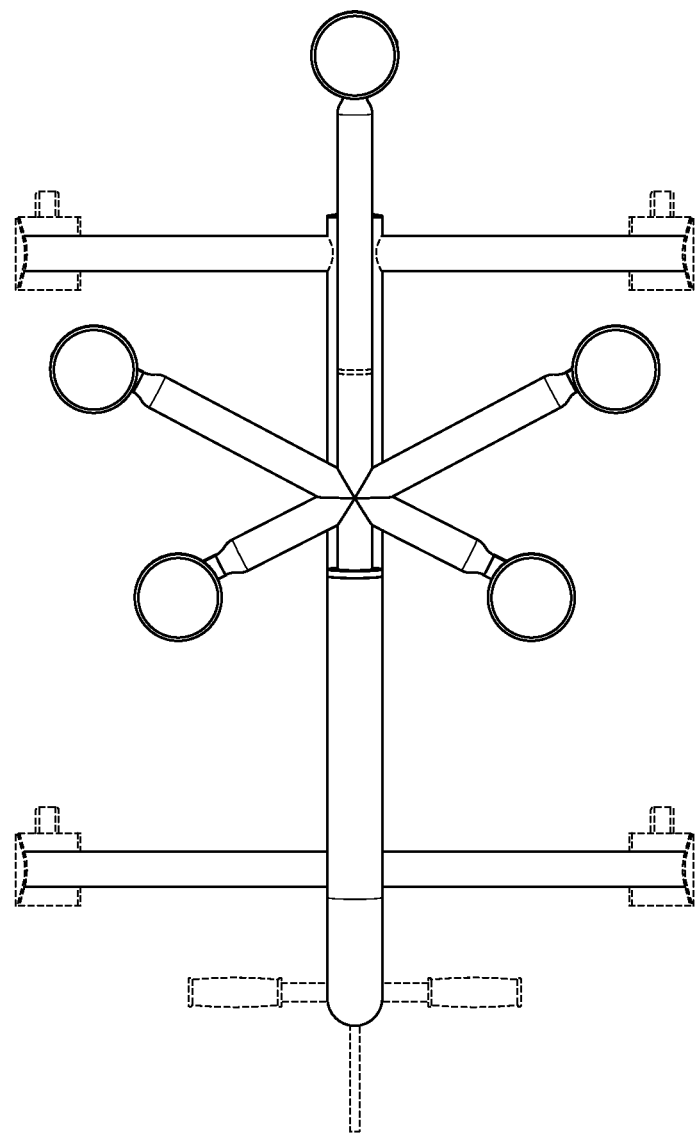
FIG. 32 is a top plan view of the lift of FIG. 1A.
Figure 33:
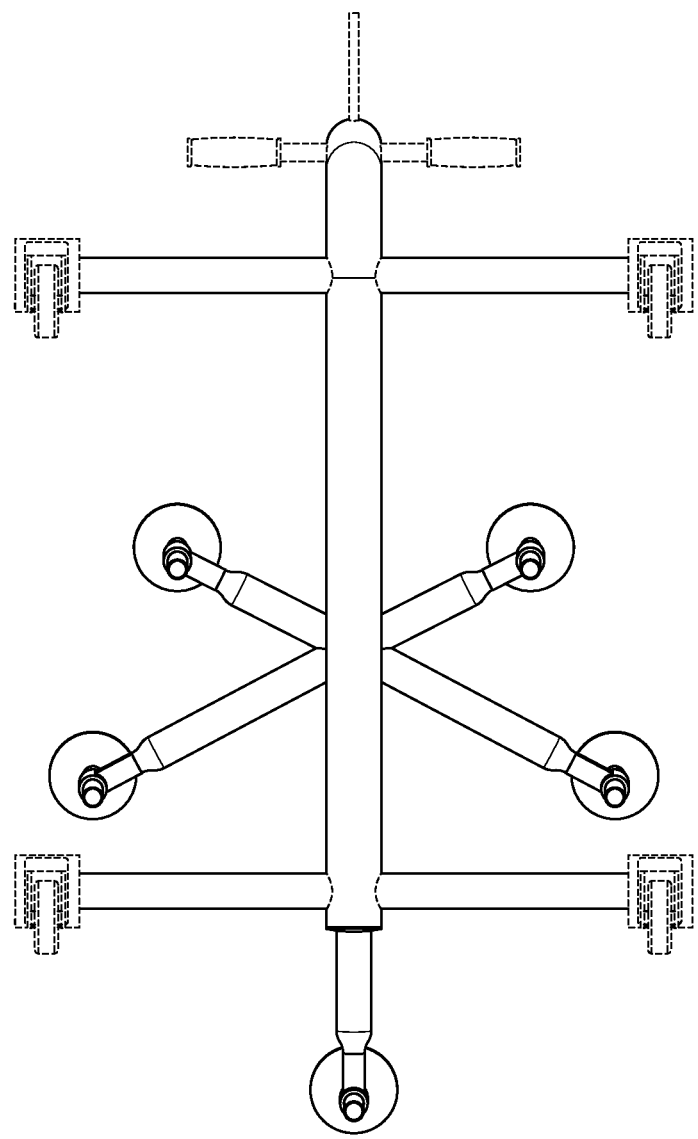
FIG. 33 is a bottom plan view of the lift of FIG. 1A.

FIG. 25 is an exploded view illustrating support carrier 36, support 38, bushings 114 and quick release pin 116. Each bushing 114 comprises tab 114a disposed at the distal end of flexible leg 114b, which allows tab 114a to deflect inwardly as bushing 114 is inserted into support carrier 36. Tabs 114a engage openings 36a so as to retain bushings 114 in support carrier 114. Support carrier 36 may include a pair of aligned openings 36b, only one of which is visible in FIG. 25. Openings 36b align with openings 114c, through which quick release pin 116 may be inserted, as described below.

Support 38 is illustrated as comprising shaft 38a with a plurality of openings 38b along its length from one end and plate 38c at the other end. Attached to plate 38c may be cushion 38d made of a suitably soft material such as EVA foam. The diameter of shaft 38a and the inner diameter of bushings 114 are selected so that there is adequate radial clearance to allow shaft 38a to freely slide longitudinally within bushings 114 but without excessive clearance that would allow shaft 38a to wobble excessively.

Supports 38 may be located at a desired vertical height relative to support carrier by aligning an appropriate opening 38b with openings 114c, allowing conformation of the tops of cushions 38d to the engaged surface of the hardtop. Shaft 38a may have indicia adjacent openings 38b which provide an indication of vertical location relative to support carrier 36 and/or relative to a plane defined by the tops of cushions 38d.

The foregoing description has been presented for purposes of illustration and description of this invention. It is not intended to be exhaustive or to limit the invention to the precise form disclosed. Examples given, such as involving the use of phrases such as "for example", "by way of example" and "an example", are to be interpreted as non-limiting. Obvious modifications or variations are possible in light of the above teachings. The embodiment was chosen and described in order to best illustrate the principles of the invention and their practical application to thereby enable one of ordinary skill in the art to utilize the invention in various embodiments and forms, and with various modifications as are suited to the particular use contemplated. Although only a limited number of embodiments is explained in detail, it is to be understood that the invention is not limited in its scope to the details of construction and arrangement of components set forth in the preceding description or illustrated in the drawings. The innovation is capable of being practiced or carried out in various ways and in various forms and other embodiments. Also specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A removable vehicle hardtop lift apparatus comprising:
    a moveable lower platform configured to fit under a vehicle, the lower platform including a main support having an upper end and a plurality of legs extending from the main support, each leg of the plurality of legs including a wheel for moving the lower platform;
    an upper platform configured to be disposed to underlie a vehicle hardtop while the vehicle hardtop is on the vehicle; and
    a linear actuator coupled between the upper platform and the lower platform and actuatable for varying the distance therebetween, the linear actuator comprising a lower end coupled with the lower platform and an upper end coupled with the upper platform;
    the linear actuator including an outer tube forming an upper end of the linear actuator and an inner tube disposed at least partially within the outer tube, the inner tube forming a lower end of the linear actuator, the linear actuator operable for moving the inner tube and the outer tube apart and together for varying a distance between the upper platform and lower platform;
    a separate first bushing element configured to seat in the upper end of the main support of the lower platform, a lower end of the inner tube of the linear actuator being disposed in the first bushing element for capturing the first bushing element between the inner tube and the main support for coupling the linear actuator with the lower platform;
    a separate second bushing element configured to seat in the outer tube of the linear actuator, an upper end of the inner tube of the linear actuator being disposed in the second bushing element for capturing the second bushing element between the inner tube and the outer tube;
    the inner tube including a slot and the outer tube including a pin which extends into the slot, the pin preventing relative rotation between the outer tube and the inner tube during actuation of the linear actuator.

2. The removable vehicle hardtop lift apparatus of claim 1, wherein the linear actuator is configured to move the upper platform linearly between a first position relative to the lower platform so it clears the underside of the vehicle hard top and a second position relative to the lower platform at which the vehicle hardtop is lifted off of the vehicle.

3. The removable vehicle hardtop lift apparatus of claim 1, wherein the upper platform comprises a plurality of spaced apart supports configured to engage the vehicle hardtop.

4. The removable vehicle hardtop lift apparatus of claim 3, wherein the upper platform comprises:
    a hub; and
    a plurality of arms extending outwardly from the hub, each arm of the plurality of arms comprising:
    a proximal arm end adjacent the hub;
    a distal arm end disposed distal the hub; and
    a support carrier disposed at the distal arm end wherein each respective support of the plurality of supports is supported by a respective support carrier.

5. The removable vehicle hardtop lift apparatus of claim 4, wherein the plurality of arms are detachable from the hub.

6. The removable vehicle hardtop lift apparatus of claim 4, wherein the upper platform comprises an upper elbow, the upper elbow comprising a straight portion connected to the hub; and a lower elbow end supported by the upper end of the linear actuator.

7. The removable vehicle hardtop lift apparatus of claim 3, wherein the upper platform comprises a plurality of support carriers wherein each respective support of the plurality of supports is carried by a respective support carrier of the plurality of support carriers.

8. The removable vehicle hardtop lift apparatus of claim 7, wherein at least one support of the plurality of supports is vertically adjustable relative to its respective support carrier.

9. The removable vehicle hardtop lift apparatus of claim 1, wherein each leg of the plurality of legs comprises a proximal leg end adjacent the main support and a distal leg end disposed distal to the main support;
    a respective wheel of each leg disposed at the distal leg end of said each leg.

10. The removable vehicle hardtop lift apparatus of claim 1 wherein the main support comprises:
    a first side and a second side opposite the first side;
    a leg support extending through the main support from the first side to the second side and comprising a first end disposed on the first side and a second end disposed on the second side;
    the proximal end of a first leg of the plurality of legs connected to and supported by the first end of the leg support; and
    the proximal end of a second leg of the plurality of legs connected to and supported by the second end of the leg support.

11. The removable vehicle hardtop lift apparatus of claim 10, wherein the first and second legs are detachably connected to and supported by the first and second ends of the leg support respectively.

12. The removable vehicle hardtop lift apparatus of claim 1, wherein when the lower platform is configured to be supported by a surface, the upper platform being disposed at an upwardly inclined angle relative to the surface supporting the lower platform.

13. The removable vehicle hardtop lift apparatus of claim 1, wherein the main support of the lower platform defines a longitudinal axis;
   wherein the linear actuator defines an actuator centerline;
   wherein the upper platform comprises an upper platform centerline;
   wherein a first angle is formed between the longitudinal axis and the actuator centerline;
   wherein a second angle is formed between the actuator centerline and the upper platform centerline; and
   wherein a sum of the first angle and the second angle is greater than 180°.

14. The removable vehicle hardtop lift apparatus of claim 13, wherein the first and second angles are each greater than 90°.

15. The removable vehicle hardtop lift apparatus of claim 13, wherein the sum of the first angle and the second angle is 184°.

16. The removable vehicle hardtop lift apparatus of claim 13, wherein the first angle and the second angle are each equal to each other.

17. The removable vehicle hardtop lift apparatus of claim 1, wherein the linear actuator comprises a crank, the crank configured to actuate the linear actuator by rotation of the crank.

18. The removable vehicle hardtop lift apparatus of claim 1, wherein the linear actuator comprises a jack screw.

19. The removable vehicle hardtop lift apparatus of claim 1, wherein the linear actuator comprises:
   a jack nut non-rotatably coupled in the inner tube, the jack nut including internal threads;
   a support plate coupled with the outer tube and having an opening extending therethrough;
   a jack shaft having external threads, the jack shaft comprising an upper shaft end disposed through the support plate opening to support the jack shaft, the jack shaft rotatably and threadingly engaging the internal threads of the jack nut; and
   a drive mechanism operably connected to rotate the jack shaft relative to the jack nut.

20. The removable vehicle hardtop lift apparatus of claim 19, wherein the drive mechanism comprises:
   a hand crank; and
   a gear assembly coupled to the hand crank and to the upper shaft end of the jack shaft;
   whereby rotation of the hand crank causes the jack shaft to rotate.

* * * * *